(12) United States Patent
Kloos et al.

(10) Patent No.: US 7,828,971 B2
(45) Date of Patent: Nov. 9, 2010

(54) RESIDENTIAL REVERSE OSMOSIS SYSTEM

(75) Inventors: Steven D. Kloos, Chanhassen, MN (US); Philip M. Rolchigo, Pittstown, NJ (US); Christopher J. Kurth, Chaska, MN (US); Chia Kung, Eden Prairie, MN (US); Thomas J. Cartwright, Albertville, MN (US); Richard M. Reckin, Colgate, WI (US); Kenneth J. Sieth, Delafield, WI (US)

(73) Assignee: GE Osmonics, Inc., Minnetonka, MN (US)

( * ) Notice: Subject to any disclaimer, the term of this patent is extended or adjusted under 35 U.S.C. 154(b) by 275 days.

(21) Appl. No.: 12/208,378

(22) Filed: Sep. 11, 2008

(65) Prior Publication Data

US 2009/0008931 A1 Jan. 8, 2009

Related U.S. Application Data

(62) Division of application No. 10/524,155, filed as application No. PCT/US03/25408 on Aug. 12, 2003, now Pat. No. 7,513,996.

(60) Provisional application No. 60/402,754, filed on Aug. 12, 2002.

(51) Int. Cl.
*B01D 63/00* (2006.01)
*B01D 63/10* (2006.01)
*B01D 61/08* (2006.01)
*F16L 27/00* (2006.01)
*B01D 61/00* (2006.01)

(52) U.S. Cl. .............................. 210/321.6; 210/321.76; 210/321.85; 210/652; 210/85; 210/98; 210/134; 285/120.1; 285/124.1

(58) Field of Classification Search ....................... None
See application file for complete search history.

(56) References Cited

U.S. PATENT DOCUMENTS

| 4,256,108 | A |   | 3/1981  | Teeuwes            |
|-----------|---|---|---------|--------------------|
| 4,292,417 | A |   | 9/1981  | Ishii et al.       |
| 4,377,654 | A |   | 3/1983  | Haas et al.        |
| 4,776,952 | A | * | 10/1988 | Burrows ..... 210/110 |

(Continued)

OTHER PUBLICATIONS

"U.S. Appl. No. 10/524,155, Response filed May 30, 2008 to Non-Final Office Action mailed Mar. 21, 2008", 14 pgs.
"U.S. Appl. No. 10/524,155, Non-Final Office Action mailed Mar. 21, 2008", 9 pgs.

*Primary Examiner*—Krishnan S Menon
(74) *Attorney, Agent, or Firm*—Schwegman Lundberg & Woessner, P.A.

(57) ABSTRACT

A reverse osmosis system that includes a housing having an inlet port, a permeate port and a concentrate port. A membrane element is within the housing. The reverse osmosis system further includes (i) a first connector that is connected to the inlet port; (ii) a second connector that is connected to the permeate port; and (iii) a third connector that is connected to the concentrate port. A key is inserted between each of the first, second and third connectors. The key is configured such that the key cannot be inserted between the first, second and third connectors unless each of the first, second and third connectors is properly connected to the respective inlet, permeate and concentrate ports. In some embodiments, the key is configured such that the key cannot be removed from between each of the first, second and third connectors when there is pressure at the inlet port.

20 Claims, 18 Drawing Sheets

U.S. PATENT DOCUMENTS

| | | | |
|---|---|---|---|
| 4,818,490 A * | 4/1989 | Carson et al. | 422/46 |
| 5,002,664 A * | 3/1991 | Clack et al. | 210/251 |
| 5,078,864 A * | 1/1992 | Whittier | 210/137 |
| 5,891,333 A * | 4/1999 | Ferguson | 210/232 |
| 5,891,334 A * | 4/1999 | Gundrum et al. | 210/232 |
| 6,190,558 B1 * | 2/2001 | Robbins | 210/652 |
| 6,245,234 B1 | 6/2001 | Koo et al. | |
| 6,368,507 B1 | 4/2002 | Koo et al. | |
| 2001/0040127 A1 * | 11/2001 | Donig et al. | 210/321.71 |
| 2002/0046969 A1 * | 4/2002 | Bartsch et al. | 210/435 |
| 2002/0177799 A1 * | 11/2002 | Rivera et al. | 604/6.01 |
| 2006/0138031 A1 | 6/2006 | Kloos et al. | |

* cited by examiner

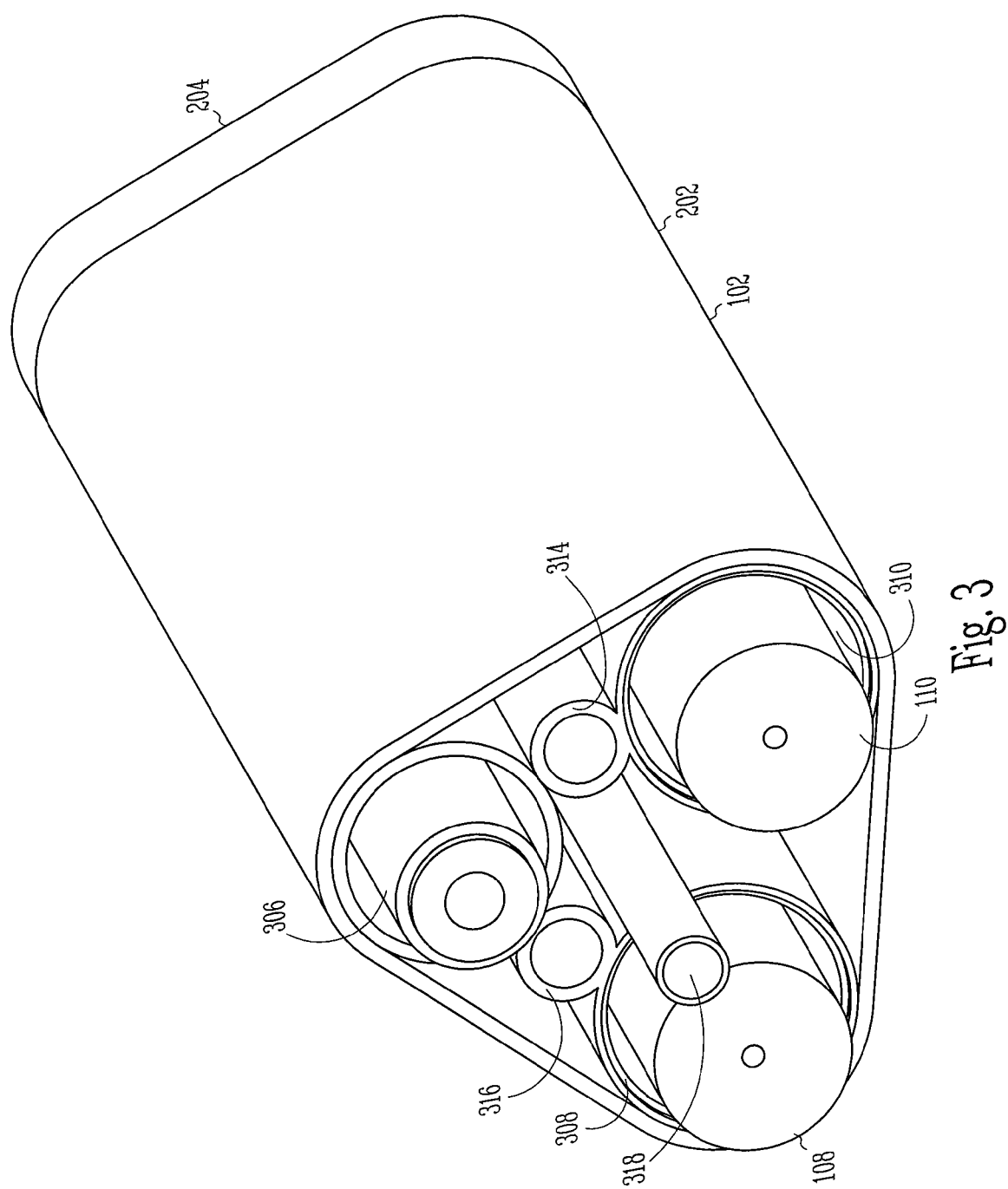

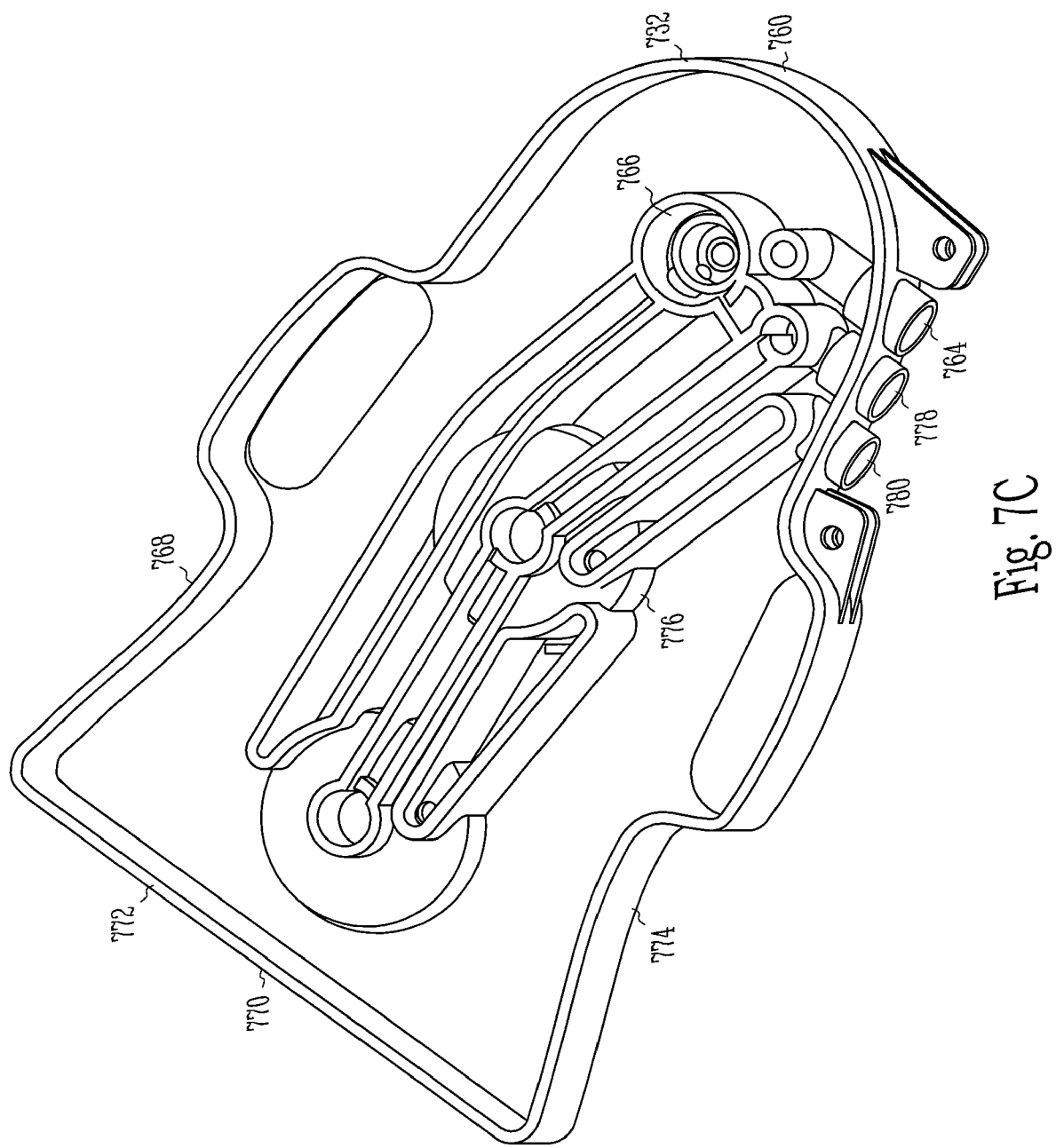

US 7,828,971 B2

RESIDENTIAL REVERSE OSMOSIS SYSTEM

CROSS-REFERENCES TO RELATED APPLICATIONS

This application is a division of U.S. application Ser. No. 10/524,155, now U.S. Pat. No. 7,513,996, filed on Jan. 30, 2006, which is a U.S. National Stage Filing under 35 U.S.C. 371 from International Application Number PCT/US2003/025408, filed Aug. 12, 2003 and published in English as WO 2004/014528 A1 on Feb. 19, 2004, which claims the benefit of U.S. Provisional Application Ser. No. 60/402,754, filed Aug. 12, 2002, under 35 USC 119(e), which applications and publication are incorporated herein by reference in their entirety. This application is related to PCT Application PCT/US03/06587, filed Mar. 3, 2003 and to PCT Application PCT/US03/17527, filed Jun. 4, 2003, both of which are incorporated herein by reference in their entirety.

FIELD OF THE INVENTION

This invention relates to the field of filtration devices, and more specifically to a system and apparatus for residential reverse osmosis (RO).

BACKGROUND

Consumers are becoming more concerned with the quality of their drinking water. When RO is used in a residential setting, a user desires to have clean water on demand. However, typical RO systems for home use have slow purified water output. Thus, typical RO systems utilize a holding tank to store water.

For example, in a typical system, water is pulled from the water line. This water is run through a carbon prefilter (often a sediment prefilter is included as well). The water then runs through a reverse osmosis membrane element. The concentrate stream from the membrane element flows to the drain, while the permeate water runs into a storage tank—usually with 1-2 gallon storage capacity. From the storage tank the permeate water runs through a second carbon filter (a polishing filter), then to a separate faucet usually mounted on the kitchen sink. Because these systems are only capable of producing a small rate of permeate, the storage tank is required on almost every system. Moreover, there are several component costs to these systems that limit the bottom line manufacturing cost of these units, with the membrane element and storage tank representing the largest overall percentage.

Accordingly, what is needed is a low-cost, compact, full-featured, pumpless, and tankless RO system for residential use.

SUMMARY

A tankless reverse osmosis system which is capable of producing a permeate flow rate of at least 500 gallons per day (GPD) when the system is operating under home reverse osmosis conditions.

BRIEF DESCRIPTION OF THE DRAWINGS

FIG. 3 shows a perspective view of the housing assembly of FIG. 2A with an endcap removed.

FIG. 7C shows a bottom portion of a manifold assembly according to one embodiment.

DETAILED DESCRIPTION

Figure 1A:
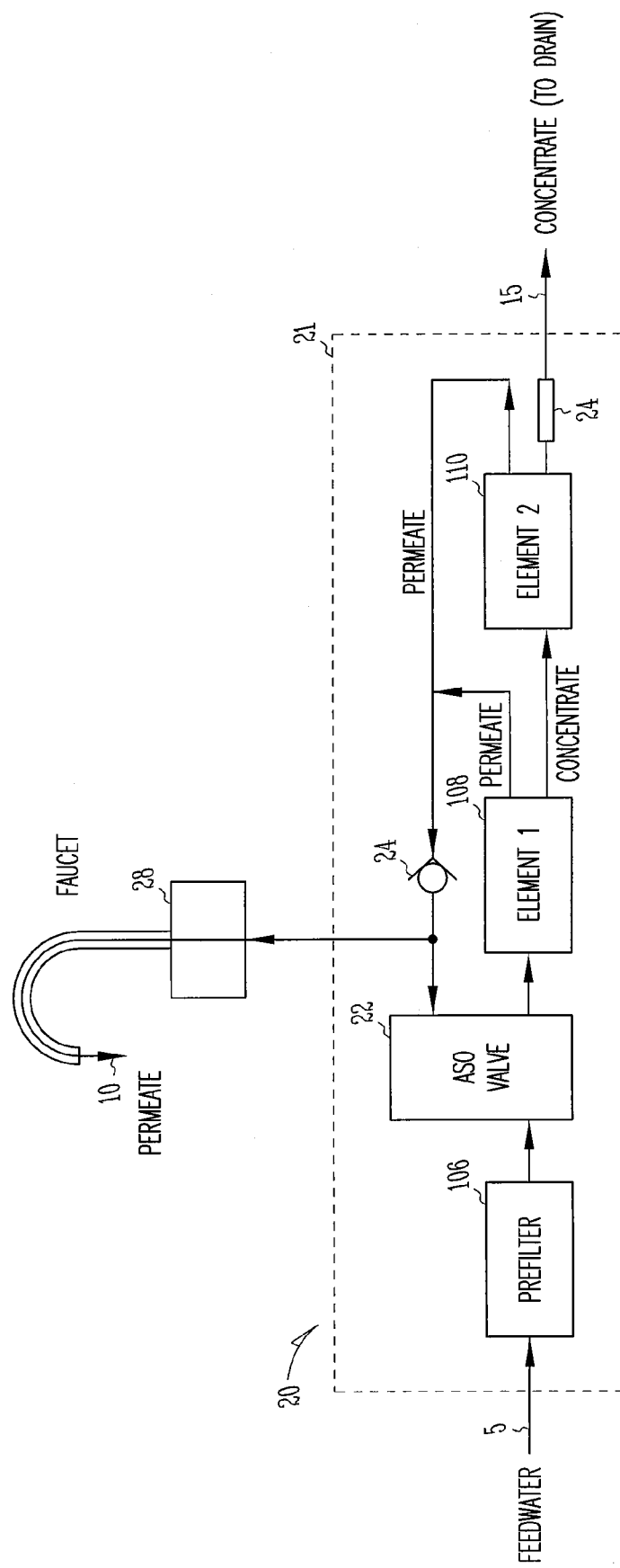
FIG. 1A shows a schematic representation of an RO filtration system according to one embodiment.

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural changes may be made without departing from the scope of the present invention. Therefore, the following detailed description is not to be taken in a limiting sense, and the scope of the present invention is defined by the appended claims and their equivalents.

DEFINITIONS

Home Reverse Osmosis Conditions: 65 psi average water pressure at the membrane surface, the feed water being 77 degrees Fahrenheit and consisting of 500 ppm NaCl in water having a pH in the range of 7-8, the membrane system operating at 25% recovery.

% Recovery: The ratio of water in the membrane permeate to water in the feed to the membrane element, expressed as a percentage.

% Passage: The parts per million of chloride ion in the permeate divided by the parts per million of chloride ion in the feed, expressed as a percentage.

% Rejection: 100% minus % Passage

A-value: The term "A value" in the context of the present discussion represents the water permeability of a membrane and is represented by the cubic centimeters of permeate water over the square centimeters of membrane area times the seconds at the net driving pressure represented in atmospheres and temperature normalized to 25 degrees C. An A value of 1 is $10^{-5}$ cm3 of permeate over the multiplicand of 1 centimeter squared of membrane area times 1 second of performance at a net driving pressure of one atmosphere. In the context of the present discussion, A values given herein have the following unit designation: $10^{-5}$ cm$^3$/(cm2.sec.atm.) or $10^{-5}$ cm/(sec.atm) at 25 degrees C.

Net Driving Pressure: The feed water pressure minus the osmotic pressure difference between the feed water and the permeate water.

Membrane Flux: The amount of permeate that passes through a membrane, expressed in gallons of permeate per square foot of active membrane per day.

Membrane Element Flux: The amount of permeate that passes through a membrane element, expressed in gallons per day.

Membrane Element: A device that configures membrane in such a way that the feed and concentrate waters can be separated from the permeate water.

High Flux Reverse Osmosis Membrane Element: A reverse osmosis membrane element that provides more than 50 gallons of permeate per day when operated under Home Reverse Osmosis Conditions.

Membrane: A semipermeable material that is capable of retaining a fraction of a component in a feed water, the component being either a dissolved or a non-dissolved substance.

Reverse Osmosis Membrane: A membrane that is capable of at least 20% NaCl rejection when operated under Home Reverse Osmosis conditions.

Permeate Channel: The permeate flow channel in a membrane element that may include a permeate carrier.

Standard Kitchen Sink Cabinet: As used herein, a standard kitchen sink cabinet has a depth (front to back) of 24 inches, a width of 36 inches, and a height of 34½ inches.

FIG. 1A shows a schematic representation of an RO system 20 according to one embodiment. In one embodiment, system 20 is a residential RO system capable of providing a sufficient, constant flow rate of filtered water without requiring a tank or a pump. (It is noted that the system is pumpless if there is sufficient feed water pressure. However, certain features of the present system are also usable with a pump in a situation where the line pressure is relatively low).

System 20 generally includes a RO housing assembly 21 and a faucet 28. Housing assembly 21 has an inlet to receive feedwater 5, which is typically at standard residential line pressure (typically between 45 to 70 psi). The feedwater is directed through a pre-filter 106, then to one or more filtering membrane elements 108, 110 which are connected in series. Each element 108 and 110 includes a permeate outlet and a concentrate outlet. The concentrate outlet of element 108 is fed into the inlet of element 110. The concentrate outlet 15 includes a flow restrictor 24. In one embodiment, the feed water line and permeate outlet line are coupled to an automatic shutoff (ASO) valve 22 which is activated by the pressure differential between the two lines. Thus, when faucet 28 is opened, the resulting pressure drop in the permeate line opens ASO valve 22, which allows the input feed water to flow through the filtration elements 106, 108, and 110. A check valve 26 in the permeate line restricts back-flow when the faucet is turned off.

In use, a saddle valve can be used for tapping into a cold water line. Then tubing is provided from the saddle valve to the inlet of assembly 21. There is outlet tubing for the concentrate stream, running to faucet 28, and outlet tubing for permeate stream 10 running to the faucet.

In various embodiments, tankless system 20 minimizes one or more of the following problems with regular systems.

A typical RO system sold today uses carbon prefiltration to protect the membrane from damage by oxidants (such as chlorine and chloramines), found in many of the municipal water supplies. The resulting effect from the removal of these disinfectants is that there can be substantial bacterial growth in the storage tanks. A disinfectant needs to be reintroduced into the permeate supply after the storage tanks. This adds extra costs to the products.

However, because there is no storage tank in system 20, the issue of bacterial contamination has been minimized. Thus, one embodiment eliminates the need for post-filtration or other post-treatment after the water has passed through the membrane elements 108, 110.

Moreover, a typical system measures 13"×13"×5" without the storage tank. The storage tank is approximately 10" in diameter by 13" tall. The combined system takes up a large amount of space within the kitchen sink cabinet. Typical tankless system which have pumps to increase the net driving pressure measure about 18"×15"×6". In contrast, the design of system 20 can be similar in size to a standard residential RO system less the storage tank or the pump. Thus offering a more compact look and reducing the concern of the amount of space required underneath the sink.

Also, because this tankless RO design eliminates the need for many of the expensive components, the system can be developed with total component costs less than lesser performing systems.

The present tankless RO design concept eliminates the need for a storage tank and places shut-off valve 22 between the feed line and the permeate line. This helps eliminate most issues relating to poor recovery, rejection and flow. This is because Membrane Flux and % Rejection are both dependent on pressure, with both generally increasing with increasing pressure. Consequently, the Net Driving Pressure has a large effect on permeate amount and permeate quality. In general, a Reverse Osmosis Membrane will yield about twice the flux and improved chloride ion retention when operated at twice the Net Driving Pressure. When a Reverse Osmosis Membrane that provides high retention of chloride ion is used, the % Passage will approximately be cut in half when the Net Driving Pressure is doubled. Consequently, tank-based RO systems that typically provide a significant back pressure that results not only in decreased Membrane Flux but also yields decreased % Rejection. The present tankless design concept allows the system to provide higher % Rejection, higher membrane flux, and run at much higher recovery than previous systems. Moreover, the present design promotes better specific contaminant reductions. One such example would be nitrate/nitrite. Since the membrane rejection capability on these ions is pressure-dependent, by eliminating the effects of backpressure from the storage tank, system 20 can provide better rejection of nitrate/nitrite for a longer period of time.

Moreover, in most residential RO system designs, the shut-off valve closes when the tank pressure is 50% the feed pressure. As the permeate is removed from the storage tank, the shut-off valve will re-open when the pressure in the tank drops approximately 33%. As an example, on an installation where the inlet pressure is 60 psi, the system will shut off when the tank pressure is 30 psi. In a typical case where the osmotic pressure is 5 psi, the Net Driving Pressure just before the shutting down is only 25 psi (60 psi feed pressure minus 30 psi permeate back pressure from the tank minus 5 psi osmotic pressure), or only about 42% of the feed water pressure. The diaphragm valve will open when about one gallon of permeate water is drawn from the tank, which results in a tank pressure of about 20 psi. Thus, the Net Driving Pressure when the system restarts is only 35 psi (60 psi feed pressure minus 20 psi permeate back pressure from the tank minus 5 psi osmotic pressure), or about 52% of the feed water pressure. Consequently, a typical home reverse osmosis membrane system operates at a Net Driving Pressure equal to only about half of the available feed water pressure.

Since the average consumer typically uses no more than about one gallon of permeate water at a time and since the Recovery has been preset to 25% based on no permeate back pressure from the tank, in actual usage these systems tend to run closer to about 12% recovery. This means that for every 1 gallon of purified water produced by a typical residential RO system, about 7.5 gallons of water is sent to the drain. Moreover, because the actual average net driving pressure of these systems when in use is fairly low, the true percent TDS rejection the consumer sees is well below what the membrane is capable of doing. For example, a typical RO membrane element which has a minimum NaCl rejection specification of 96% will, under normal operating conditions, have an actual TDS rejection closer to 90%. The present design improves these aspects of home RO systems.

The present design and system 20 is more compact, costs less to make and service, and provides better performance than previous products.

Figure 1B:
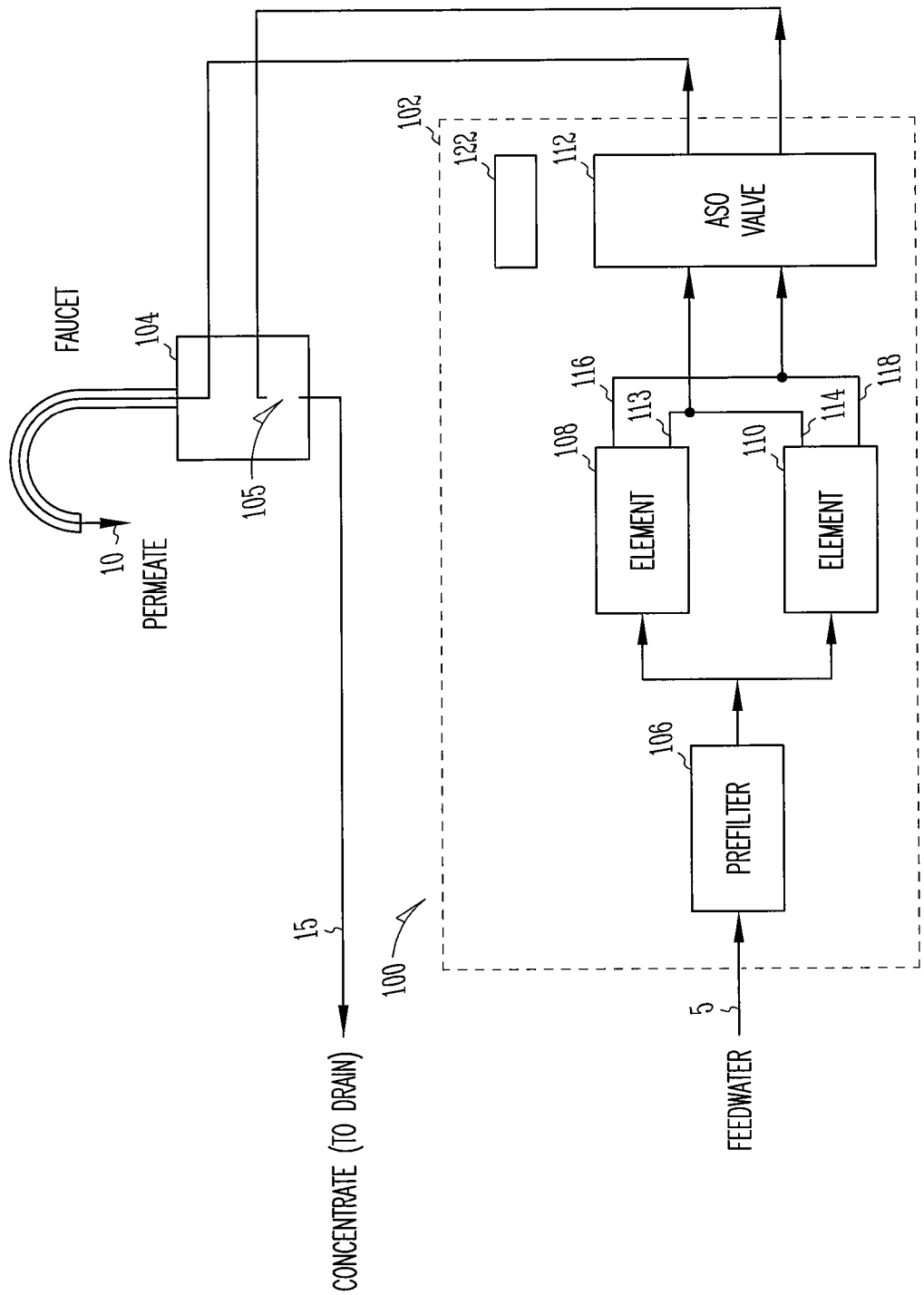
FIG. 1B shows a schematic representation of an RO filtration system according to one embodiment.

FIG. 1B shows a schematic representation of a filtration system 100 according to one embodiment. In one embodiment, system 100 is a residential reverse osmosis filtration system capable of providing a sufficient, constant flow rate of filtered water without requiring a tank or a pump. (As noted above, the system is pumpless if there is sufficient feed water pressure. However, certain features of the present system are also usable with a pump in a situation where the feed water pressure is relatively low). As will be discussed below, system 100 omits many of the component parts used in typical home RO systems currently, thus providing a lower manufacturing cost, less chance of breakdown, and an overall smaller size. Moreover, the present tankless RO design concept provides numerous features defining a new paradigm for point-of-use filtration systems.

System 100 generally includes a RO housing assembly 102 and a faucet 104. Housing assembly 102 has an inlet to receive feedwater 5, which is typically at standard residential line pressure (typically between 45 to 70 psi). The feedwater is directed through a pre-filter 106, then to one or more filtering membrane elements 108, 110 which are connected in parallel. Each element 108, 110 includes a permeate outlet 113, 114 and a concentrate outlet 116, 118, respectively. In one embodiment, the concentrate outlet line and permeate outlet line are coupled to an automatic shutoff (ASO) valve 112 which is activated by the pressure differential between the two lines. Thus, when faucet 104 is opened, the resulting pressure drop in the permeate line opens ASO valve 112, which allows the concentrate to flow, and allows feedwater to flow through the filtration elements 106, 108, and 110. The concentrate and permeate leave the assembly 102 and enter an air-gap faucet 104, where the permeate is directed out of the faucet and the concentrate is sent to the drain. The system can include electronics 122 within the assembly and connected to various other members to perform analysis of performance of the system. Further details of each of these members will be discussed below to better describe the present system.

In various embodiments, either system 100 or system 20 (FIG. 1A) can be modified to be in parallel or series and can have an ASO valve between either the feed and permeate lines or between the concentrate and permeate lines. Moreover, in some embodiments a plurality of systems 20 and 100 can be connected together. For example, a user can couple two or more of systems 20 or systems 100, or a combination of the two, into any series or parallel flow configuration.

In use, a saddle valve can be used for tapping into a cold water line. Then tubing is provided from the saddle valve to the inlet of assembly 102. There is outlet tubing for the concentrate stream, running to an air-gap on faucet 104, and outlet tubing for permeate stream running to the faucet. The concentrate stream opens when faucet is turned on, then closes when faucet is shut off. There is tubing from the air-gap faucet to a drain clamp for the concentrate stream.

In various embodiments, the present tankless system 100 minimizes one or more of the following problems with regular systems.

In current systems, a shut-off valve is coupled to the feed water line and the line to the storage tank and is regulated by the pressure differential between the feed line and the storage tank. When the storage tank fills up, the backpressure exerted on a diaphragm in the valve is enough to close the valve and thus close off the feed water supply, thus shutting down the system. These valves are inherently susceptible to leaking at the various sealing areas. Also, the introduction of small particles around the diaphragms can prevent the valve from shutting off entirely, thus allowing water to run to drain continuously. Another issue with present shut-off valves is their effect on recovery. This issue will be addressed later.

However, system 100 does not require the standard shut-off valve between the feed line and a tank. In contrast, shut-off valve 112 is located between the permeate and the concentrate lines and is controlled by the faucet, thus the potential for failures is greatly reduced. Also, the placement of valve 112 provides better TDS rejection, produces a more consistent permeate flow, and runs at a higher recovery rate.

Another problem on previous systems is the check valve between the storage tank and the membrane element. This check valve prevents the back-flow of water from the storage tank when the feed water is shut off. Because the pressure in the tank (typically 30-40 psi), is greater than the pressure to drain (0 psi), when the system is shut off, a system with a failed check valve allows the permeate water in the storage tank to run back through the membrane and down the drain. This creates two issues. The first is that the customer never has a storage of permeate water and the second is that the result of the back pressure exerted by the tank on the membrane element causes cracking of the membrane around the product water tube and leads to membrane failure.

However, since system 100 does not have the back pressure from a storage tank, no check valve is required—thus eliminating the check valve as a potential failure mode.

A typical RO system sold today uses carbon prefiltration to protect the membrane from damage by oxidants (such as chlorine and chloramines), found in many of the municipal water supplies. The resulting effect from the removal of these disinfectants is that there can be substantial bacterial growth in the storage tanks. A disinfectant needs to be reintroduced into the permeate supply after the storage tanks. This adds extra costs to the products.

However, because there is no storage tank in system 100, the issue of bacterial contamination has been minimized. Thus, one embodiment does not require post-filtration or post-treatment after the water has passed through the membrane elements 108, 110.

The design of system 100 can be similar in size to a standard residential RO system less the storage tank or the pump. Thus offering a more compact look and reducing the concern of the amount of space required underneath the sink. Also, because this tankless RO design eliminates the need for many of the expensive components, the system can be developed with total component costs less than lesser performing systems.

As noted above, with the present tankless RO design concept eliminating the need for a storage tank and a shut-off valve positioned between the feed line and the storage tank, most issues relating to poor recovery, rejection and flow are resolved. This is because Membrane Flux and % Rejection are both dependent on pressure, with both generally increasing with increasing pressure. Consequently, the Net Driving Pressure has a large effect on permeate amount and permeate quality. In general, a Reverse Osmosis Membrane will yield about twice the flux and improved chloride ion retention when operated at twice the Net Driving Pressure. When a Reverse Osmosis Membrane that provides high retention of chloride ion is used, the % Passage will approximately be cut in half when the Net Driving Pressure is doubled. Consequently, tank-based RO systems typically provide a significant back pressure that results not only in decreased Membrane Flux but also yields decreased % Rejection. The present tankless design concept allows the system to provide higher % Rejection, a higher membrane flux, and run at much higher recovery than previous systems. Moreover, the present design promotes better specific contaminant reductions. One such example would be nitrate/nitrite. Since the membrane rejection capability on these ions is very pressure-dependent, by eliminating the effects of backpressure from the storage tank, system 100 can provide better rejection of nitrate/nitrite for a longer period of time.

Moreover, in most residential RO system designs, the shut-off valve closes when the tank pressure is 50% the feed pressure. As the permeate is removed from the storage tank, the shut-off valve will re-open when the pressure in the tank drops approximately 33%. As an example, on an installation where the inlet pressure is 60 psi, the system will shut off when the tank pressure is 30 psi. In a typical case where the osmotic pressure is 5 psi, the Net Driving Pressure just before the shutting down is only 25 psi (60 psi feed pressure minus 30 psi permeate back pressure from the tank minus 5 psi osmotic pressure), or only about 42% of the feed water pressure. The diaphragm valve will open when about one gallon of permeate water is drawn from the tank, which results in a tank pressure of about 20 psi. Thus, the Net Driving Pressure when the system restarts is only 35 psi (60 psi feed pressure minus 20 psi permeate back pressure from the tank minus 5 psi osmotic pressure), or about 52% of the feed water pressure. Consequently, a typical home reverse osmosis membrane system operates at a Net Driving Pressure equal to only about half of the available feed water pressure.

Since the average consumer typically uses no more than about one gallon of permeate water at a time and since the Recovery has been preset to 25% based on no permeate back pressure from the tank, in actual usage these systems tend to run closer to about 12% recovery. This means that for every 1 gallon of purified water produced by a typical residential RO system, about 7.5 gallons of water is sent to drain. Moreover, because the actual average net driving pressure of these systems when in use is fairly low, the true percent TDS rejection the consumer sees is well below what the membrane is capable of doing. For example, a typical RO membrane element which has a minimum NaCl rejection specification of 96% will, under normal operating conditions, have an actual TDS rejection closer to 90%. The present design improves these aspects of home RO systems.

The present design and system 100 is more compact, costs less to make and service, and provides better performance than previous products.

Figure 2A:
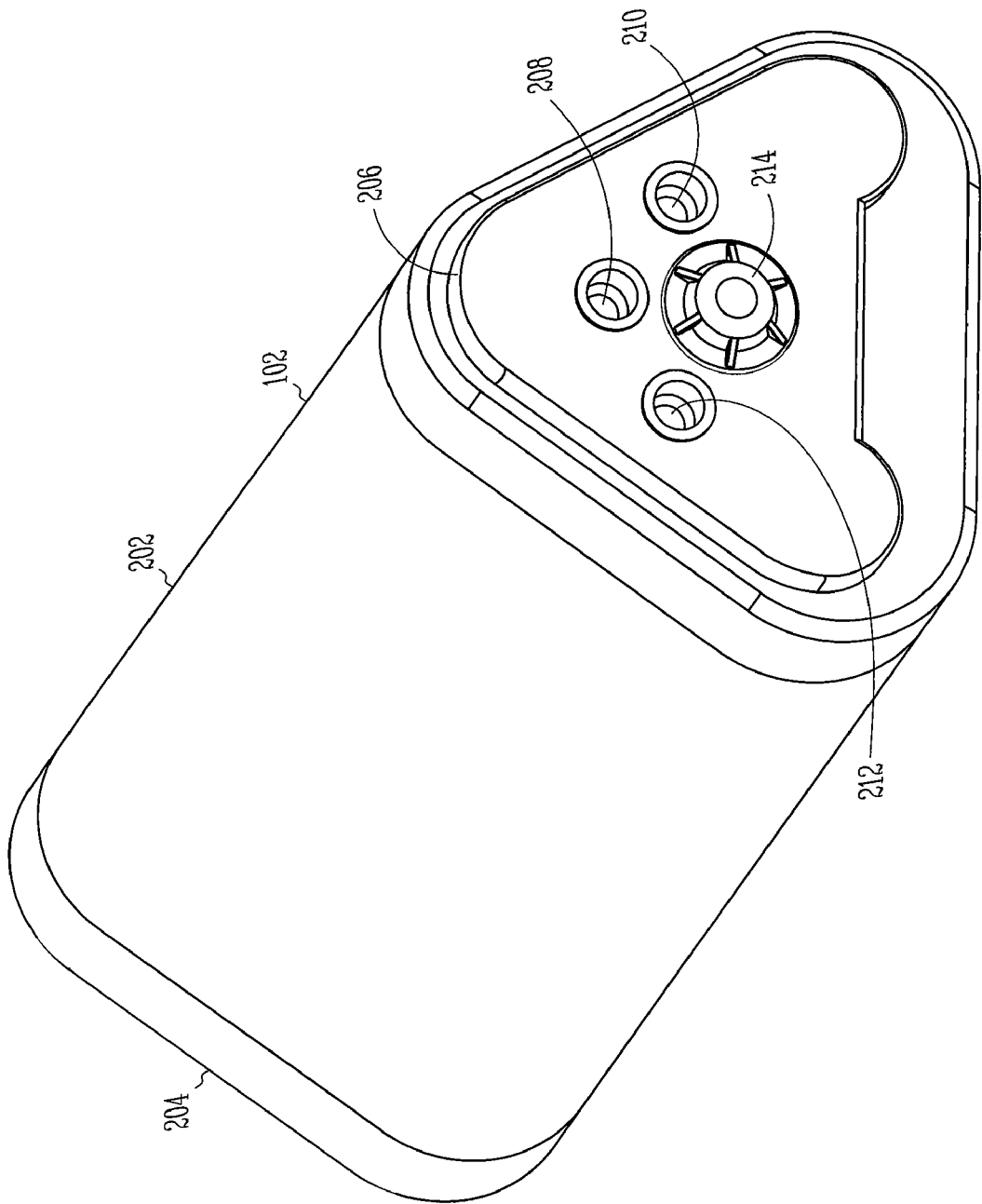
FIG. 2A shows a perspective view of a housing assembly according to one embodiment.

FIG. 2A shows a perspective, outside, view of housing assembly 102 according to one embodiment. In one embodiment, housing assembly 102 includes an elongated assembly body 202. In this example, assembly body 202 includes a generally triangular cross-section and includes a first endcap 204 and a second endcap 206 at each end of the body respectively. Assembly 202 endcap 206 includes a feedwater inlet 208 which is connectable to a feed water line. Endcap 206 also includes permeate outlet 210 and concentrate outlet 212. The triangular shaped endcap 206 is removably mounted to the end of assembly body 202 by a single retaining member such as an endcap nut 214. As will be discussed below, endcap 206 covers the ends of all the filter members and elements within body 202. Thus, the present design allows a single retaining member 214 to be removed to provide access to all the filters. This greatly reduces the time and effort required to change or check the filters.

Figure 2B:
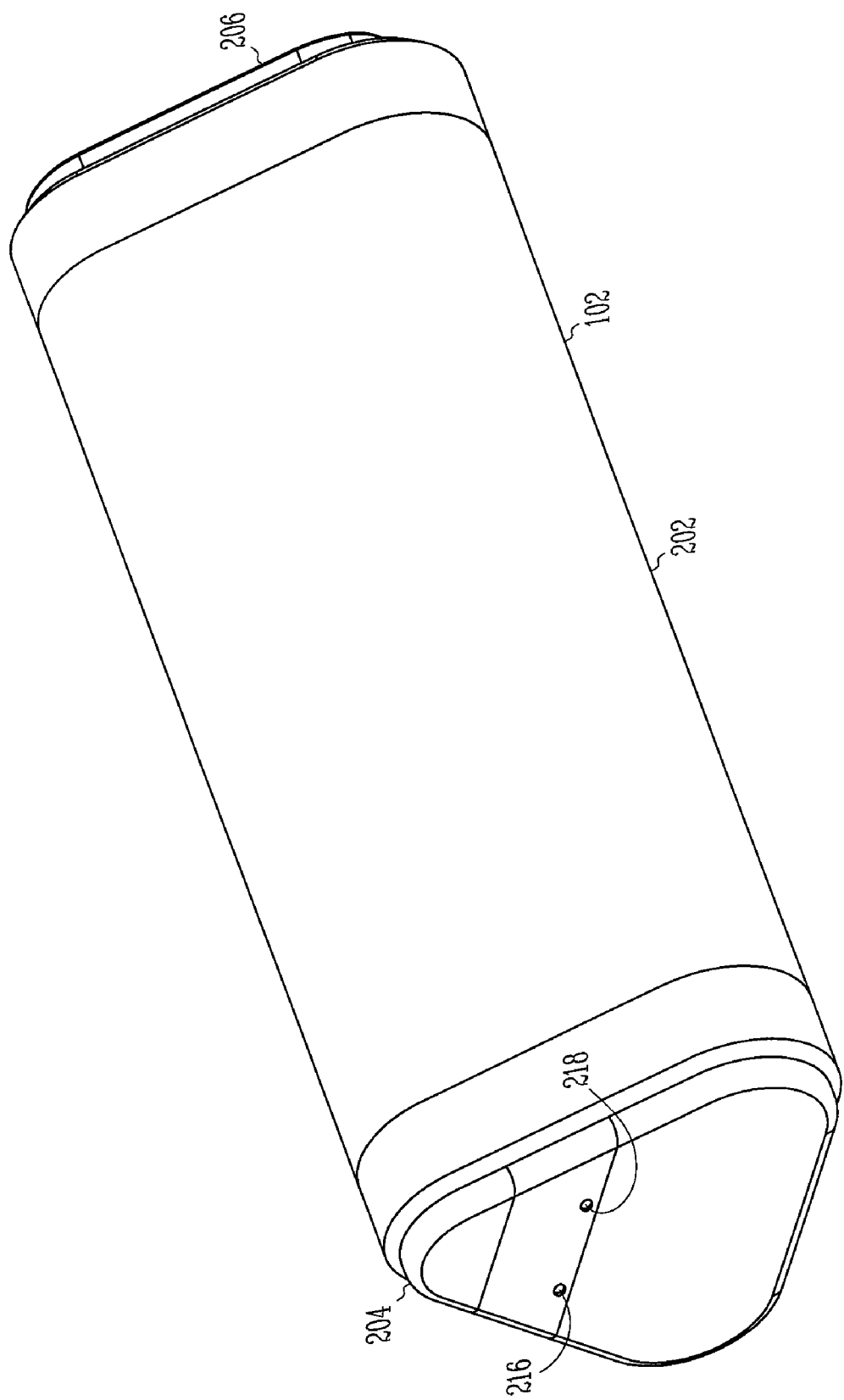
FIG. 2B shows another perspective view of the housing assembly of FIG. 2A.

FIG. 2B shows further details of endcap 204 of body 202. Endcap 204 has a generally triangular shape to cover one end of assembly body 202. In this example, the system includes a set of indicators, such as one or more status indicators 216 and 218. Indicators 216 and 218 can be LEDs, for example, mounted and exposed on endcap 204. These indicators can be used to indicate the condition of the filtration members within body 202, indicating to a user when it's time to change the filters. In some embodiments, indicators 216 and 218 are mounted on other surfaces of body 202, or on endcap 206.

FIG. 3 shows a perspective view of housing assembly 102 with endcap 206 removed. Here it can better be seen how filter 106, 108, and 110 are exposed once the endcap 206 is removed. Assembly body 202 includes a cylindrical pre-filter chamber 306 which extends longitudinally down the assembly body. Similarly, a first membrane element chamber 308 and a second membrane element chamber 310 are also cylindrical tubes running longitudinally down the body. As discussed above, these chamber are oriented such that body has a generally triangular cross-section. Assembly body 202 also includes a permeate outlet line 314 running longitudinally along the body and a concentrate outlet line 316 running longitudinally along the body. Outlet lines 314 and 316 bring the concentrate and permeate up from the far end of assembly 102 and out of assembly 102 through the permeate and concentrate outlets 210 and 212 (FIG. 2A.) A mounting member 318 is used to mount with retaining member 214 to mount endcap 206 to the housing assembly body.

In one embodiment, this assembly design is a molded design integrally incorporating all flow lines and filter chambers with the body. This provides efficient manufacturing as well as a small volume, small footprint design. Thus, the present assembly can fit under sinks without any problem. For example, one example assembly 102 has dimensions of approximately 21.25 inches long, 8.25 inches wide, and 7.63 inches high. Some examples have a longest dimension of approximately 35 inches or less, some are approximately 24 inches or less, some are approximately 22 inches or less.

In one embodiment, the overall volume of the assembly, measured as the container volume in which the assembly can be contained is approximately the size of a standard kitchen sink cabinet or smaller. In some embodiments, the volume in which the assembly can be contained is less than or equal to approximately 4500 cubic inches. In one embodiment, the volume can be approximately 720 cubic inches or less; another embodiment is approximately 920 cubic inches or less; another is approximately 1500 cubic inches or less; another embodiment is approximately 1700 cubic inches or less; another is approximately 2000 cubic inches or less.

Figure 9:
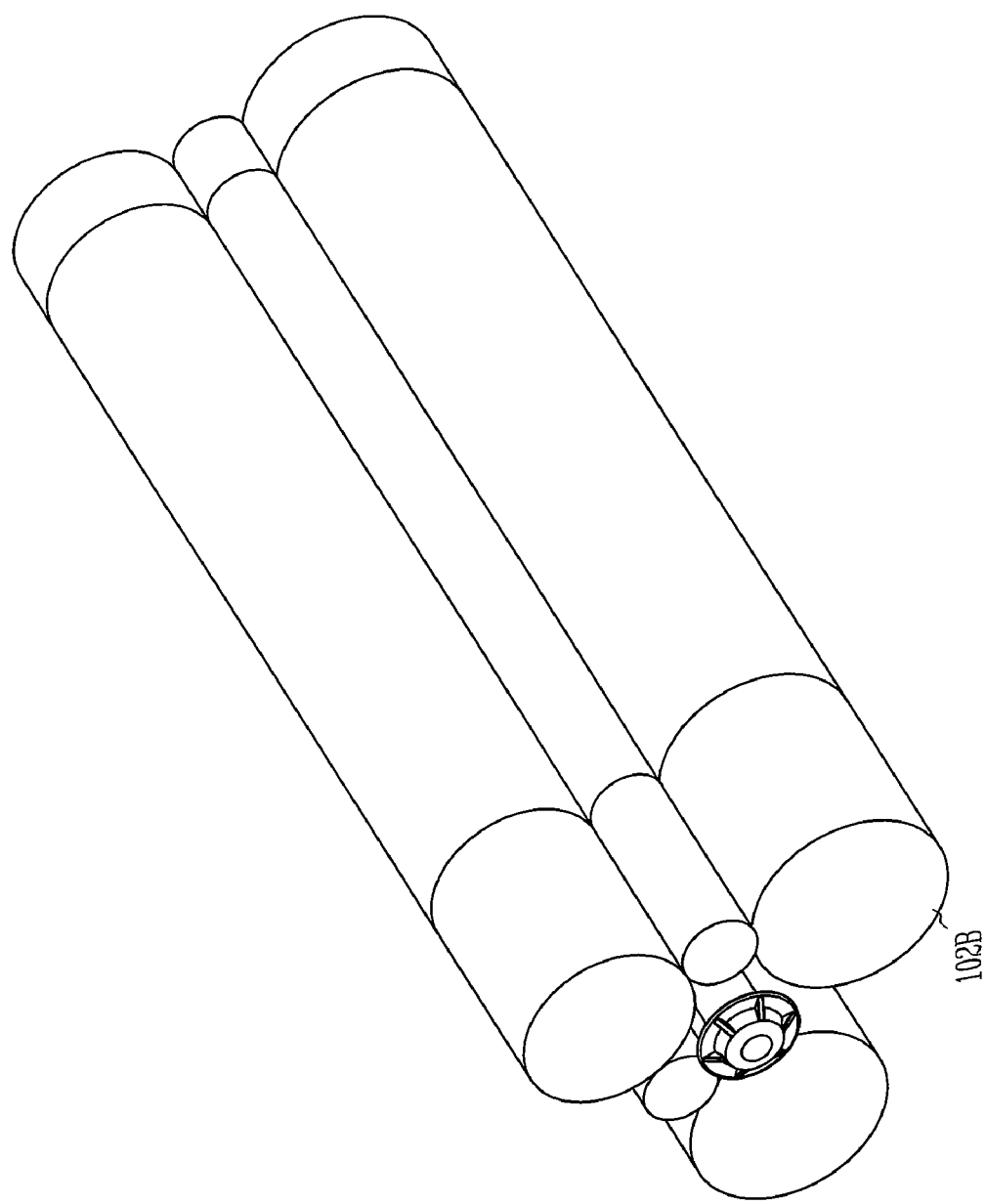
FIG. 9 shows a perspective view of a housing assembly according to one embodiment.

In one example, shown in FIG. 9, an assembly 102B can have a cross section where the filter elements define the outer dimension and the permeate and concentrate channels are also the outside dimension, providing a minimum volume concept such that the element cartridge housings are the assembly. Thus, in one embodiment, the present system can include one or more housings having a total displacement volume of less than or equal to approximately 668 cubic inches. Moreover, since the present design eliminates the need for pumps or storage tanks, the assembly is the only unit between the feedwater line and the faucet.

Prefilter 106 is mounted within chamber 306. Pre-filter 106 can be a carbon filter, and/or a sediment filter. Filter elements 108 and 110 are configured to provide a parallel flow arrangement through the system. In other words the output of prefilter 106 communicates with both the inlets of filters 108 and 110.

In one embodiment, filters 108 and 110 are high flux RO membrane filter elements. These high flux membrane elements help eliminate the need for a reservoir tank for the system and help eliminate the need for any pump to pressure the feedwater through the system. Some RO membrane elements 108 and 110 have a spiral wound membrane element which includes a first membrane sheet and a second membrane sheet separated by a permeate carrier. In one embodiment, the spiral wound membrane elements 108 and 110 can be dimensioned to have a diameter of approximately 2.5 to 3 inches or less and a length of approximately 18 inches or less. In various examples, to be discussed below in detail, the elements can be adapted to have various sizes, leaf numbers, and flow rates, and different numbers of elements can be provided in the system. One example provides a permeate flow rate of at least 75 GPD. Other examples have flow rates of at least 250 GPD, at least 500 GPD, at least 700 GPD, and at least 750 GPD, and at least 1500 GPD. In some examples only one RO membrane element is provided, or a pair of elements are connected in series. Membrane elements 108 and 110 can be single-leaf or multi-leaf designs. One embodiment has a diameter of approximately 6 inches or less and a length of approximately 18 inches or less. One example has a diameter of 3 inches or less. One example has a diameter of approximately 2.5 to 3 inches. One embodiment uses a single-leaf or multi-leaf spiral wound design as described in PCT Application PCT/US 03/17527. Some embodiments use a membrane formed as described in PCT Application PCT/US 03/06587. Further details of membrane and element design will be discussed below.

Figure 4:
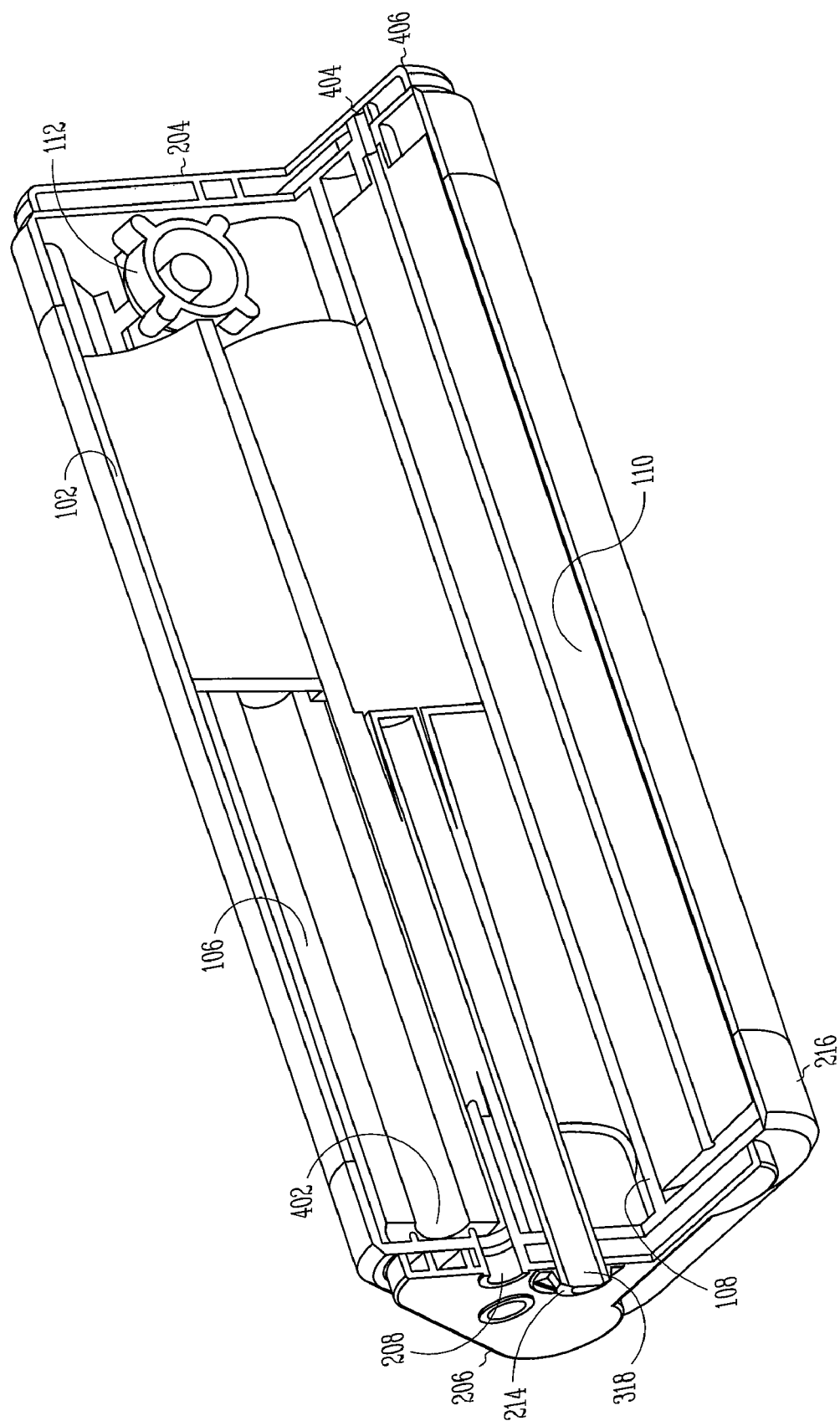
FIG. 4 shows a section view of the housing assembly of FIG. 2A.

FIG. 4 shows a section view of the housing assembly 102. As water flows through assembly 102, the feedwater first enters through inlet 208. The feedwater enters into the chamber of pre-filter 106 and after being filtered the filtered water enters into molded passages 402 in the endcap. These molded passages bring the filtered water to membrane elements 108 and 110. The permeate exits through the end of the membrane element into a molded passage 404 in endcap 204. The concentrate enters into passages 406 in the endcap. The permeate and concentrate then go through opposite sides of ASO valve 112 and through lines 314, 316 (FIG. 3), and exit through the permeate and concentrate outlets of endcap 206. Accordingly, all the flow within assembly 102 is either through filtering members 106, 108, 110, or through molded portions of assembly 102 such as molded passages in the endcaps and molded concentrate and permeate lines 314 and 316. Again, this design feature provides for a compact design with less worry of breakage, etc. Moreover, by using a molded design and by utilizing the endcaps of both ends of the assembly as flow devices, the present assembly lessens the length needed without increasing the footprint of the device.

Figure 5:
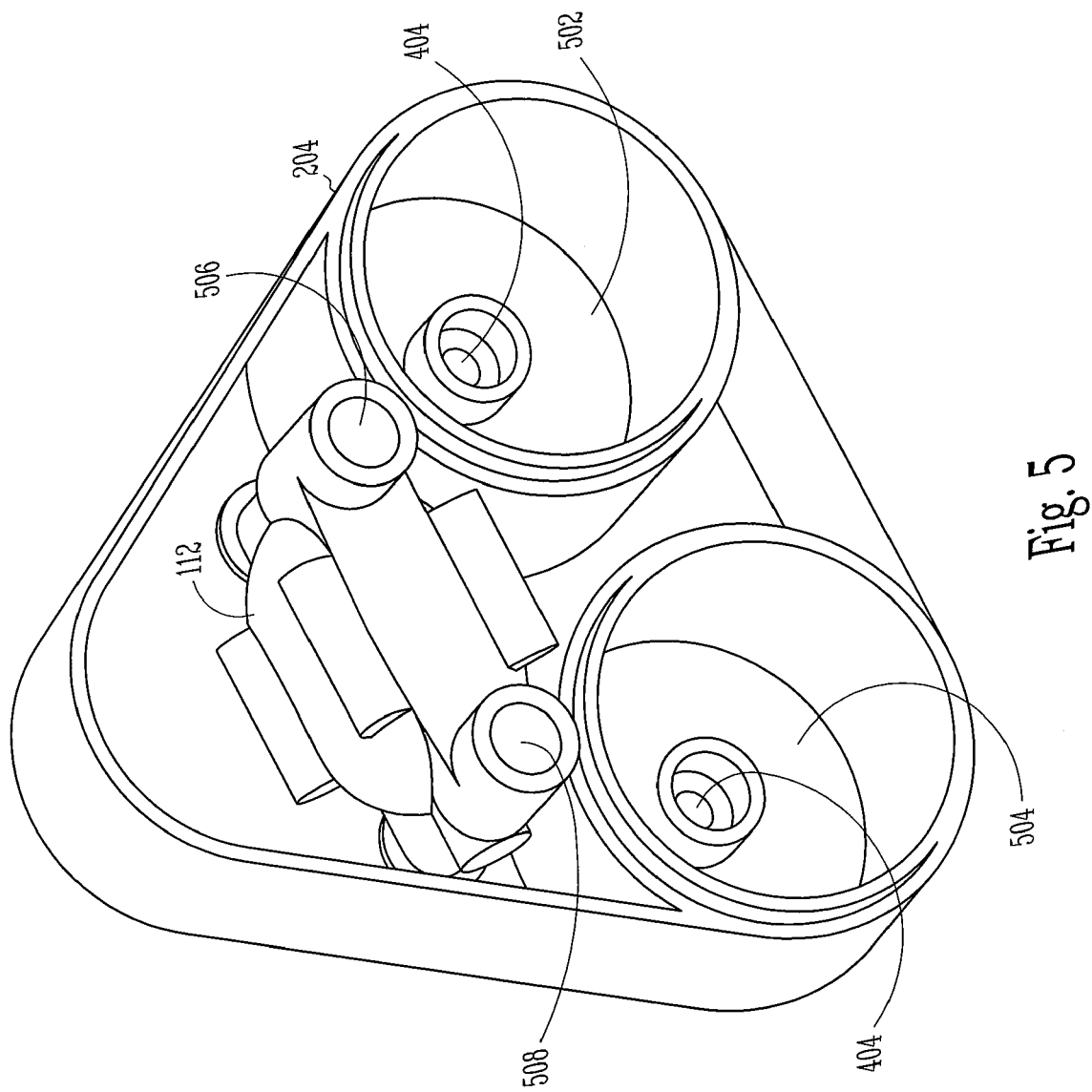
FIG. 5 shows a perspective view of an endcap according to one embodiment.

FIG. 5 shows further details of endcap 204 according to one embodiment. Permeate passages 404 begin in the center of chamber endcap portions 502 and 504. Shut off valve 112 is positioned to receive the permeate within a passage 506 after the permeate has gone though the passages in the endcap. Similarly, passage 508 receives the concentrate. In this embodiment, ASO valve 112 is positioned to operate on the concentrate and permeate lines. The benefits of this arrangement are discussed above. By sensing the pressure in the permeate line, the valve prevents concentrate flow and flow through the system when the faucet is not turned on.

Figure 6A:
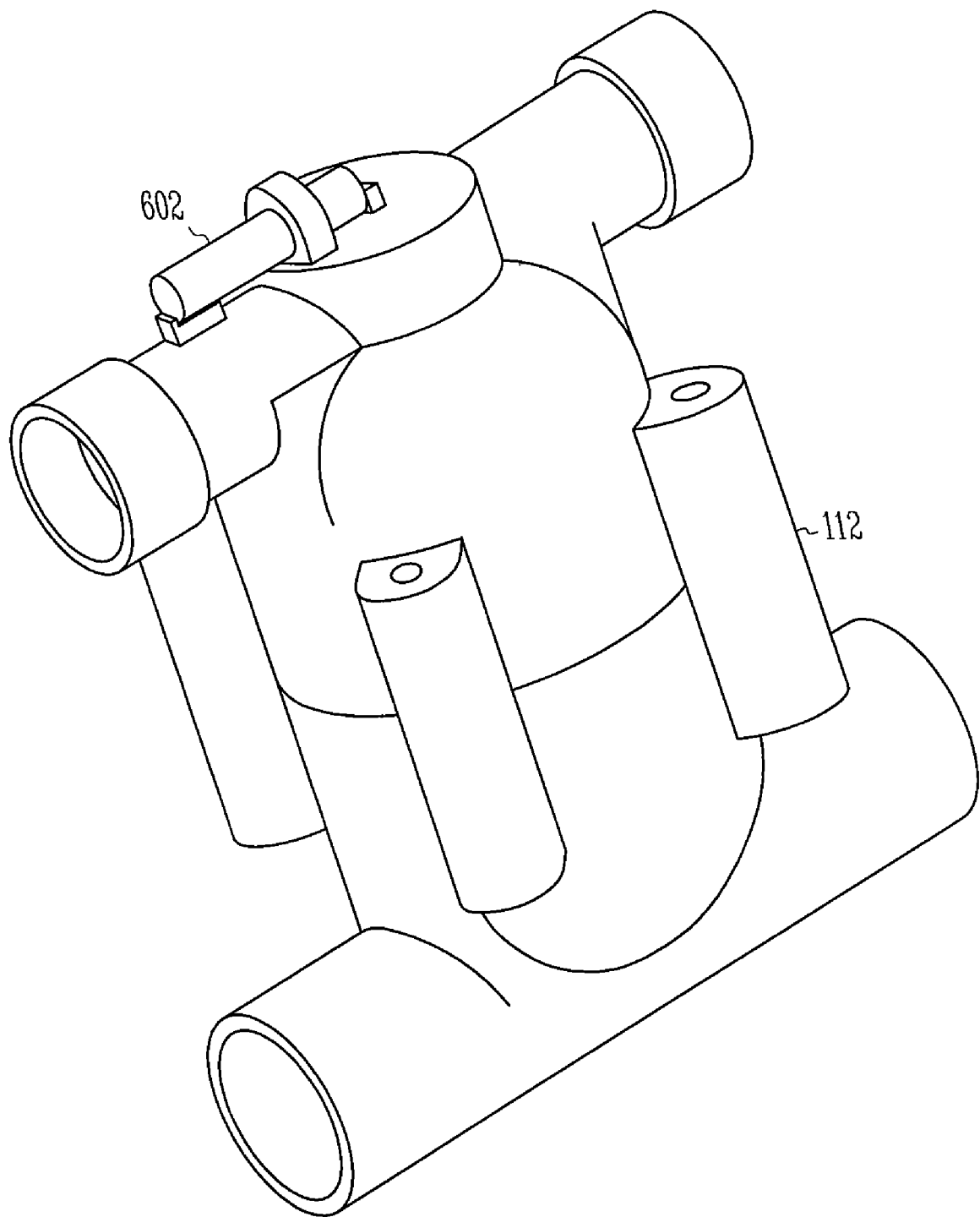
FIG. 6A shows a perspective view of an automatic shutoff valve according to one embodiment.
Figure 6B:
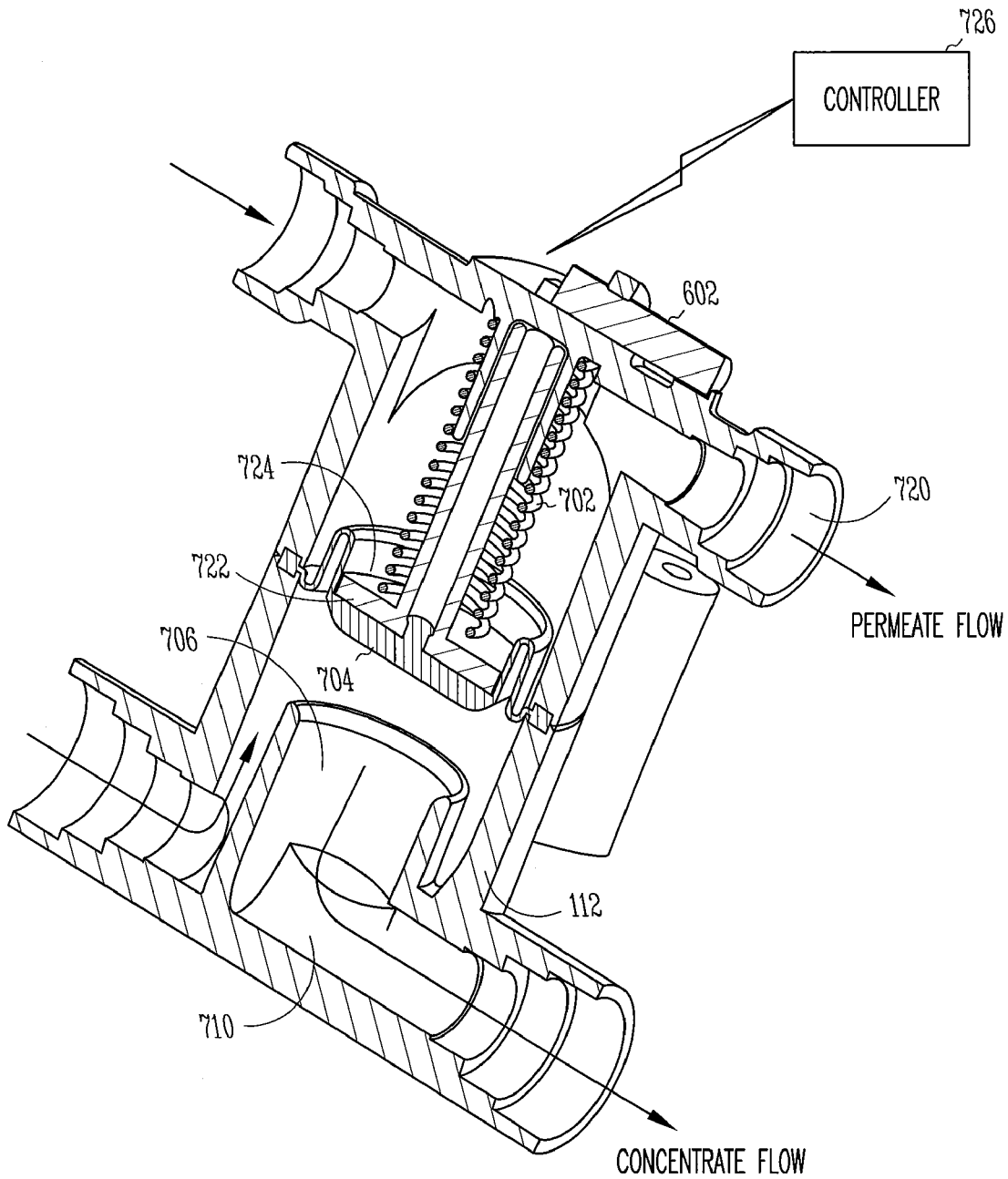
FIG. 6B shows a section view of the automatic shutoff valve of FIG. 6.

FIGS. 6A and 6B show a perspective view and a section view, respectively, of automatic shutoff valve 112 according to one embodiment. The valve includes a sensor such as reed switch 602 to detect flow though the valve, as will be discussed below. Valve 112 includes a permeate flow passage 720 and a concentrate flow passage 710 separated by a diaphragm 704 which is actuated by the pressure differential between the permeate and concentrate lines. When a user opens the faucet at the outlet of the permeate flow, it lowers the pressure in permeate flow passage 720, which causes the diaphragm to move upward, thus opening concentrate line passage 710. This allows fluid to flow through the system.

A spring 702 urges the diaphragm against the opening 706 of a portion of concentrate flow passage 710. This keeps the valve in a normally closed position to ensure positive shut off of the valve when the pressure differential between the permeate outlet line and the concentrate outlet line causes the valve to close (i.e., when the faucet is turned off). Valve 112 includes a magnet carrier 722 and a magnet 724 positioned above the diaphragm. Magnet 724 is positioned within the automatic shutoff valve such that the magnet activates reed switch 602 when the automatic shutoff valve is open (i.e. when the faucet is opened). Reed switch can be operatively coupled to a control circuitry 726 to provide information about the system to a controller or directly to a user. In one example, diaphragm 704 is a rolling diaphragm which provides sensitive movement to better control flow through the valve. The rolling diaphragm also allows a smooth, easy travel, as opposed to typical o-ring pistons which have a higher resistance to movement.

Again, due to the location of the ASO valve 112 in system 100, and the pumpless and tankless nature of the present system, the system provides a constant recovery rate. Moreover, when the faucet is opened there is a substantially constant rate of flow of permeate through the faucet. Also, the present system provides that the ASO valve, and thus flow throughout the system, is activated by the user opening and closing the faucet.

Figure 7A:
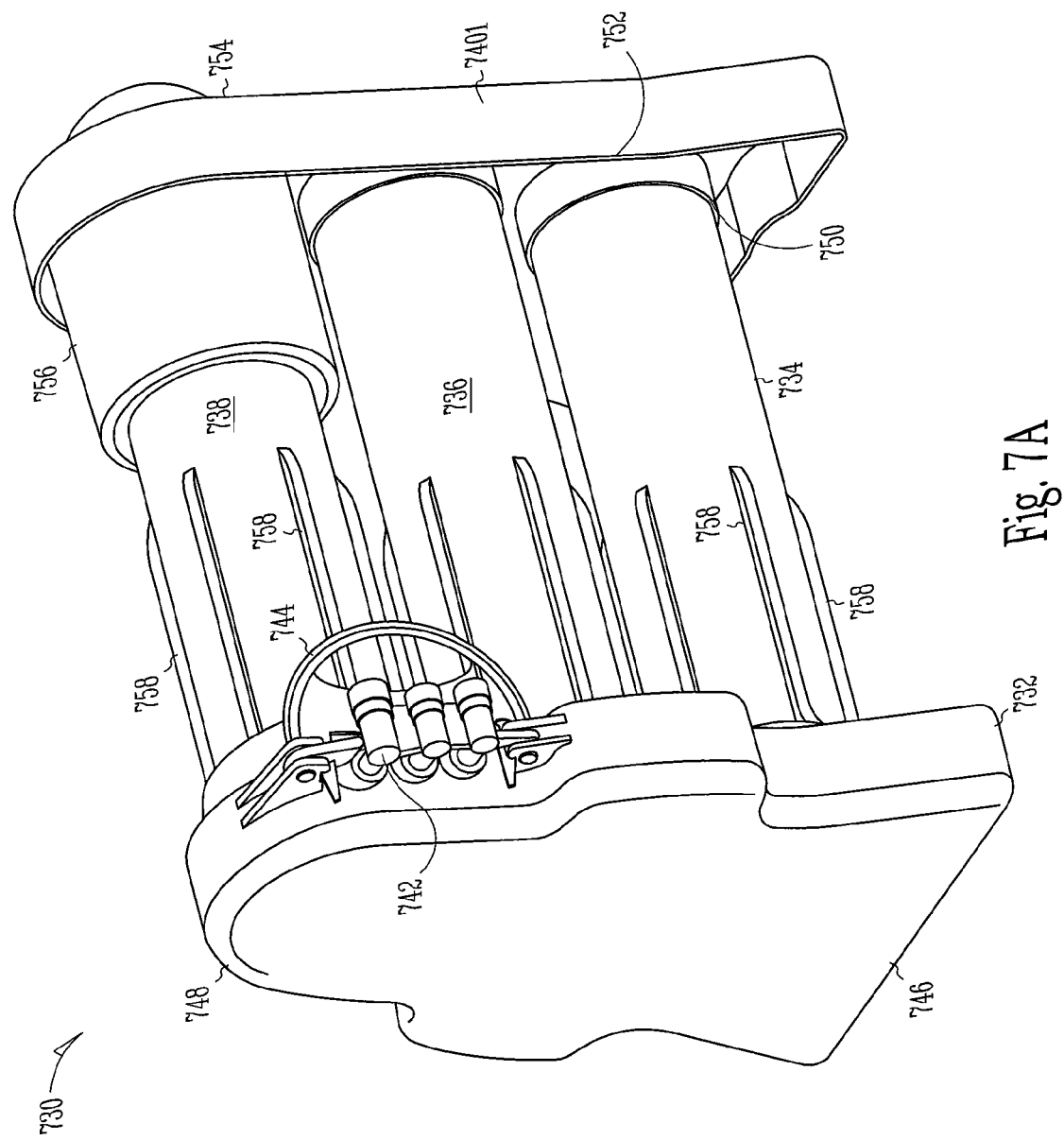
FIG. 7A shows a perspective view of a housing assembly according to one embodiment.

FIG. 7A shows a perspective, outside view of a housing assembly 730 according to one embodiment. In one embodiment, housing assembly 730 includes a manifold 732, one or more filter cartridge housings 734, 736, and 738, and a base leg 740. A connector 742 is connected to manifold 732 and includes a quick-connect fitting on the portion coupled to the manifold and push-in fittings, such as John Guest brand fittings, which are connectable to tubes to bring feed water into manifold 732, and waste and permeate water away from the manifold. In one embodiment, housing assembly has dimensions of approximately 17 inches high (top to bottom in FIG. 7A), 11 inches deep, and 21 inches wide (left to right in FIG. 7A). This allows the assembly to fit within a rectangle space having a volume of approximately 4000 cubic inches or less. In some examples, the assembly can be dimensioned to fit within a rectangular space having a volume of approximately 4500 cubic inches or less. Other examples can vary the dimensions as desired, and as discussed above for housing assembly 102.

Manifold 732 includes internal molded fluid passages to control the flow of water through the system, as will be discussed below. In this example, manifold 732 includes a generally triangular shape having a wider bottom 746 than top 748. Similarly, base leg 740 has a generally triangular shape. These shapes allow the assembly to rest solidly on a surface when orientated as shown in FIG. 7A. Alternatively, the assembly can be orientated such that base-leg 740 is on the bottom and cartridge housings 734, 736, and 738 extend upwardly, or manifold 732 can be on the bottom and the cartridge housings can extend up towards the base leg 740.

In one embodiment, cartridge housing 738 includes a pre-filter element, while cartridge housings 734 and 736 include RO elements configured in either a parallel or series flow path, as explained above in FIGS. 1-3.

Base leg 740 is a plastic molded member which provides support for the distal ends of cartridge housings 734, 736, and 738. Base leg 740 is removable from the cartridge housings. Base leg 740 can include one or more holes or indents 750, 752, and 754 to hold the ends of the cartridge housings. In one example, a wrench portion 756 is incorporated into one of the holes. Wrench portion 756 is an elongated cylindrical section which includes tabs or other gripping features internally. These tabs engage the raised ridges 758 on cartridge housings 734, 736, and 738 to allow leg-base 740 to be used as a wrench to either tighten or remove the cartridge housings from manifold 732. For example, FIG. 7E shows how base leg 740 can be removed from cartridge housings 734, 736 and 738, and then wrench portion 756 can be slipped over one of the cartridges to be used as a wrench to tighten or loosen the chosen cartridge.

In one embodiment, connector 742 is a unitary member including three internal passages for feeding water to and receiving waste and permeate water from the manifold. A locking member 744 engages the connector to keep it in place. In other embodiments, three separate connectors can be used to attach the system to outside components.

Figure 7B:
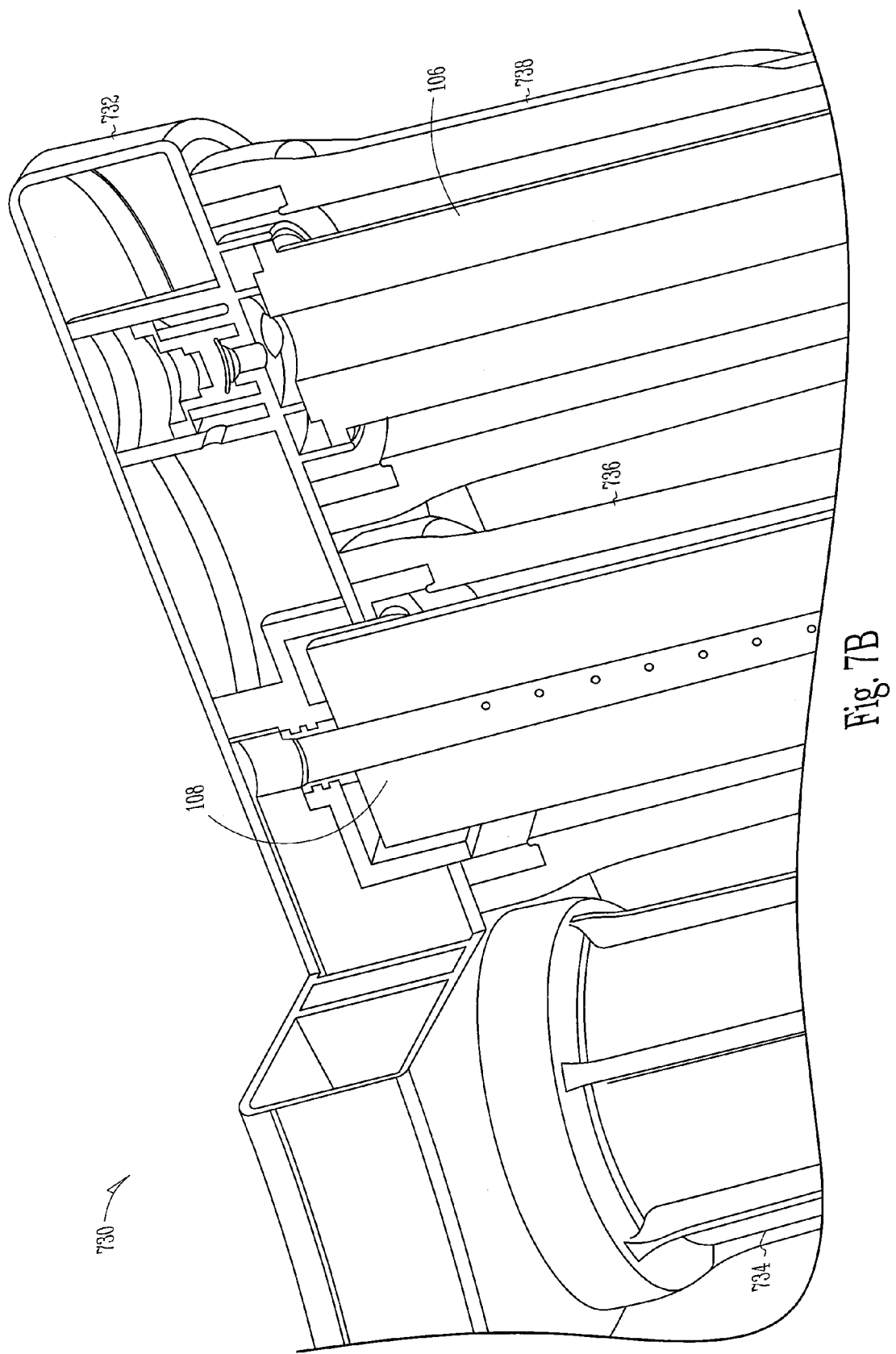
FIG. 7B shows a cut-away view of a portion of the assembly of FIG. 7A.

FIG. 7B shows a cut-away view of a portion of assembly 730. Each of cartridge housings 734, 736, and 740 are threaded to a socket on a lower surface of manifold 732. In this example, cartridge housing 738 encases pre-filter 106 and cartridge housing 736 encases element 108.

Figure 7D:
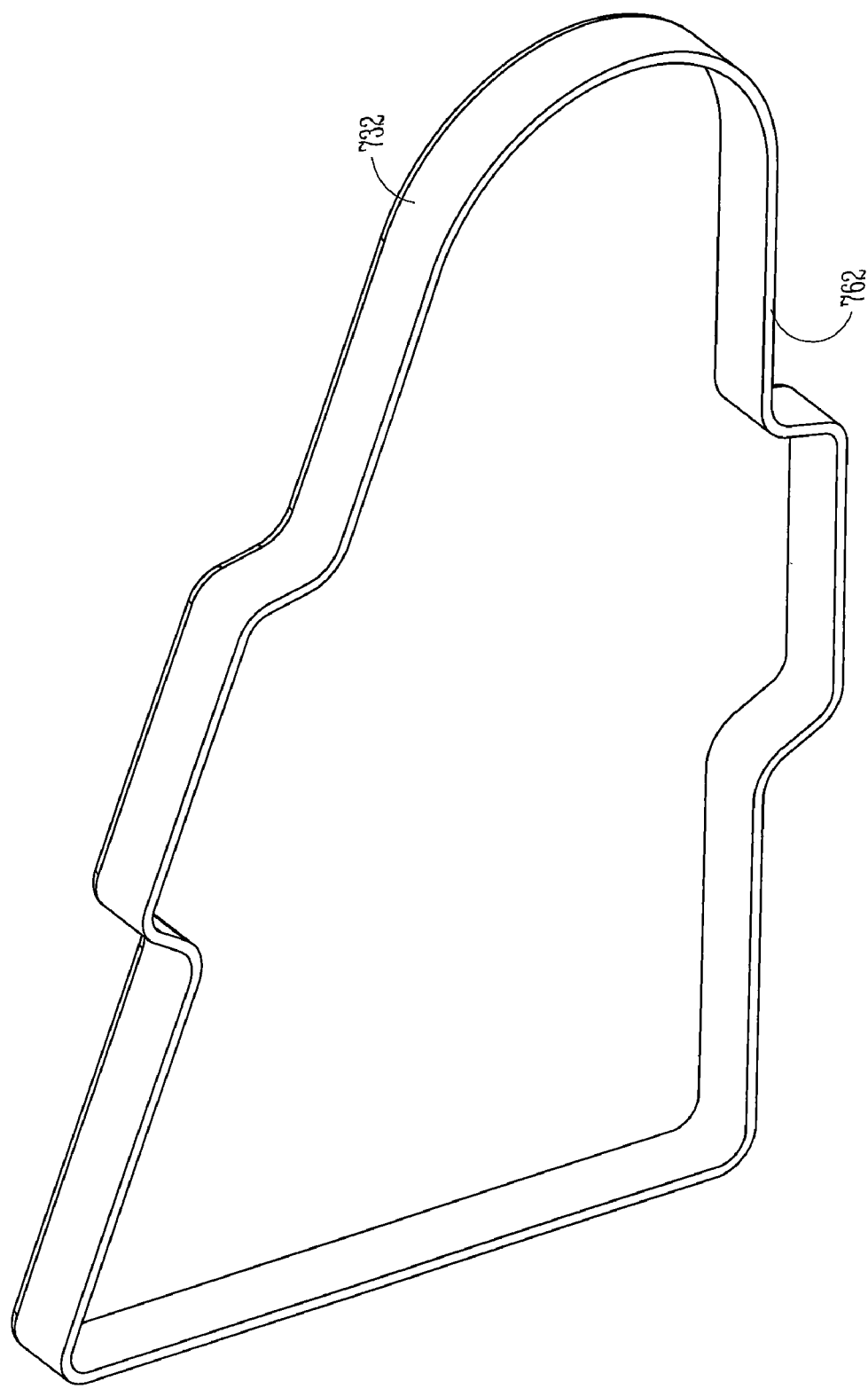
FIG. 7D shows a top portion of a manifold assembly according to one embodiment.
Figure 7E:
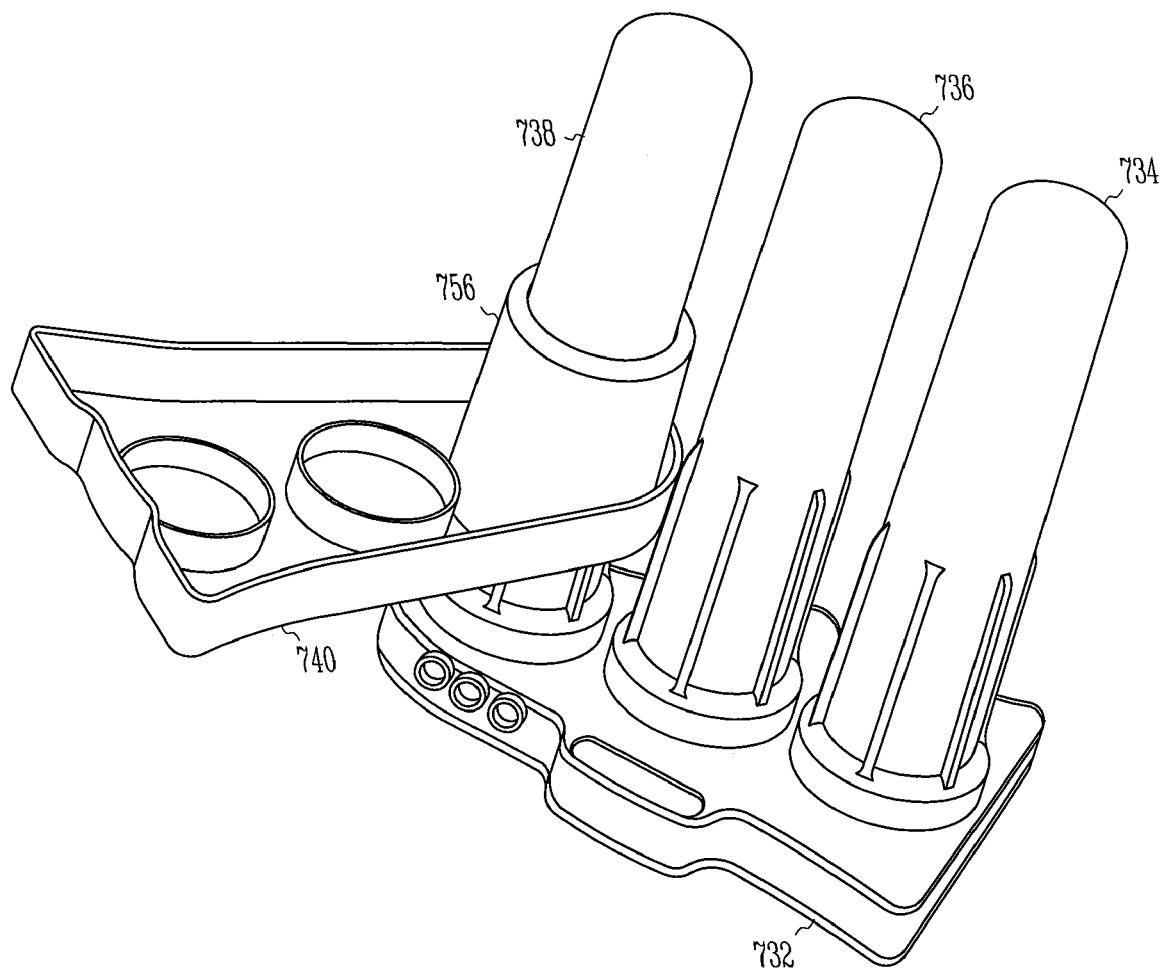
FIG. 7E shows a perspective view of the housing assembly of FIG. 7A.

FIGS. 7C and 7D show a top 762 and bottom 760 of manifold 732 according to one embodiment. In this example, all the fluid passages of manifold 732 are molded into bottom 760 with top 762 covering them when the two parts are attached together. In some embodiments, top 762 can include passages either separately or as mating passages to be combined with the passages of bottom 760. Some embodiments provide a manifold formed out of three or more separate members combined together.

In this example, manifold 732 provides a series flow through the membrane elements. Feed water enters through input port 764 and enters the pre-filter located at socket 766. The pre-filtered water then goes down passage 768 to enter the membrane located at socket 770. The permeate flows out of port 772 while the concentrate flows through passage 774 to the membrane element at socket 776. From there the permeate flows out through outlet port 778 while the concentrate flows out outlet port 780. Again, other configurations provide for a parallel flow through the membrane elements.

Figure 7F:
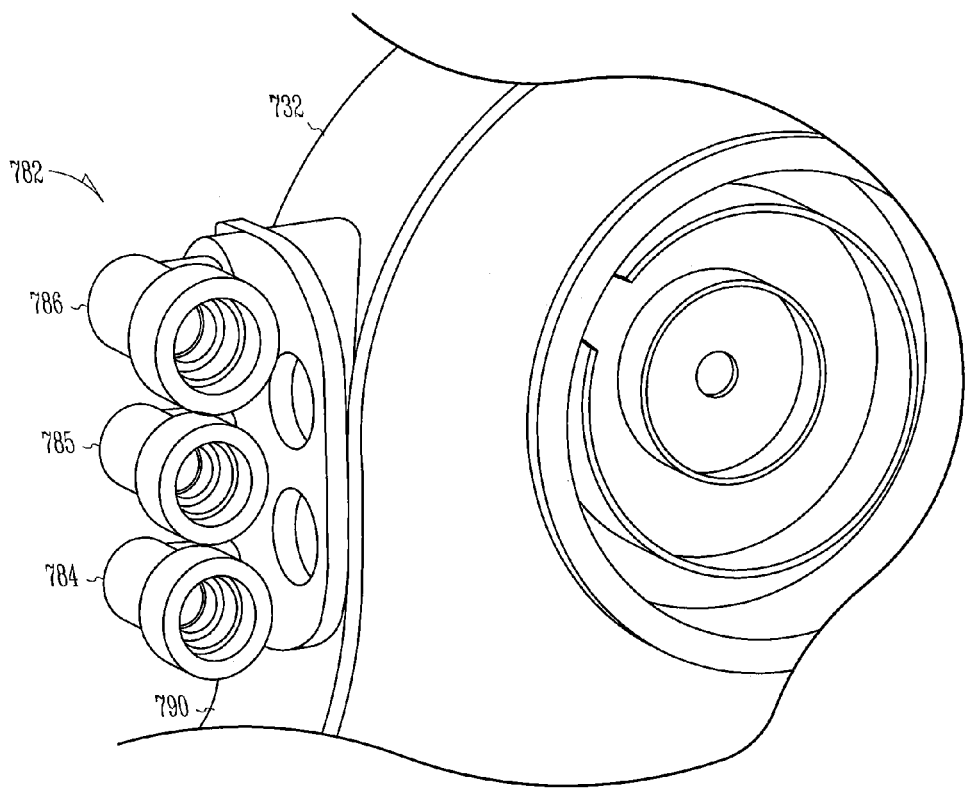
FIGS. 7F and 7G show front and back perspective views of a connector according to one embodiment.
Figure 7G:
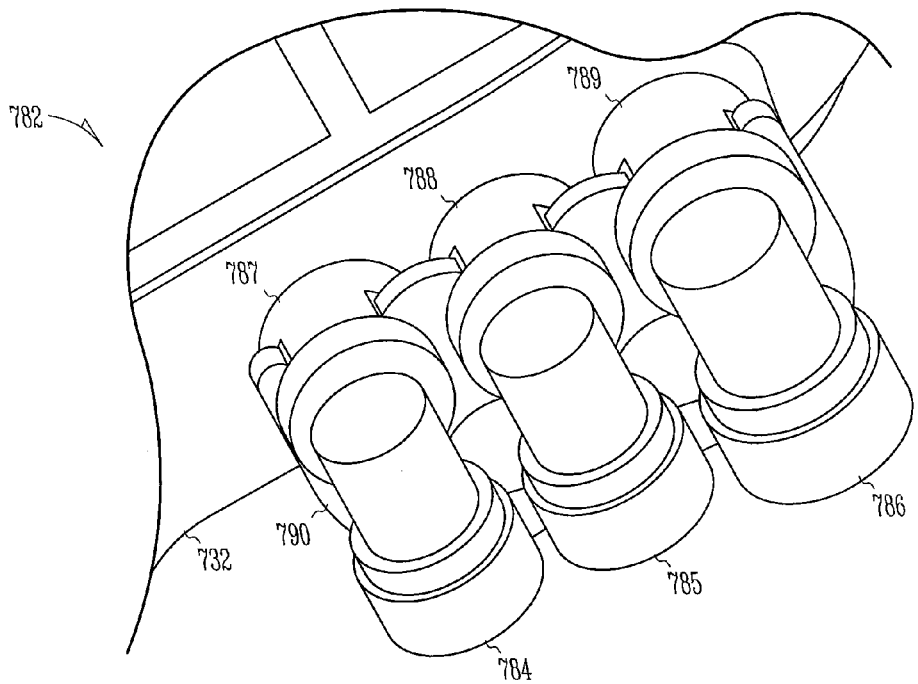

FIGS. 7F and 7G show a connector 782 according to one embodiment. In this example, connector 782 includes two or more separate connector members 784, 785, and 786. Each connector includes a first end connectable to a hose or tube and a second end for connecting to one of the ports of manifold 732 of the housing assembly. The members 784, 785, and 786 can be separately removed and attached to the housing assembly. They are configured such that a locking key 790 holds the connector members in position on the inlet and outlet ports in a polarized configuration. For example, the members 784, 785, and 786 can have different diameters and locking key 790 can include grip or locking portions 787, 788, and 789 dimensioned to fit specific ones of members 784, 785, and 786. In one example, each of the connecting members can include one or more mating protrusions to mate with adjacent mating protrusions on adjacent members.

Figure 8A:
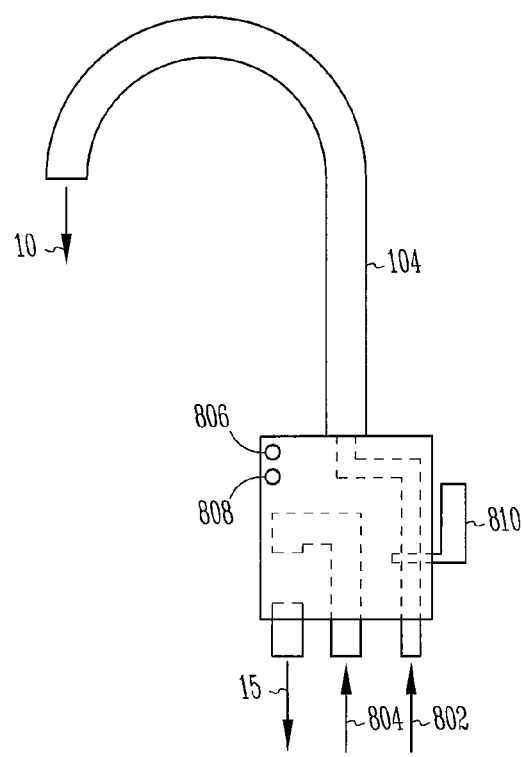
FIG. 8A shows an air gap faucet according to one embodiment.

FIG. 8A shows a faucet 104 according to one embodiment. Faucet 104 can be an air-gap faucet which includes a permeate inlet 802 and a concentrate inlet 804. The concentrate 15 crosses the air-gap and goes down the drain. The permeate 10 goes through the faucet. An actuator 810 allows a user to control the faucet. A set of indicators, such as a pair of indicators 806 and 808, indicate to a user the status of the system. Indicators 806 and 808 can be LEDs for example. This allows a user to know the status without having to look at the indicators on the housing assembly. In one example use, the indicators 806 and 808 on the faucet indicate either "good" or "bad" without giving details. The user can then check the housing assembly light indicators 216, 218 (See FIG. 2B) to check on the problem. The assembly lights can then indicate that a specific filter needs to be changes for example. In one example, by providing indicator light sets on both the faucet and the assembly the present system can be incorporated into a refrigerator unit. Such refrigerator units omit the faucet 104, thus this dual light system allows a user to still check the status of the system by checking the housing assembly.

In one embodiment, permeate inlet 802 has a ¼" inner diameter and concentrate inlet 804 has a ⅜" inner diameter, and concentrate outlet 15 has a ⅜" inner diameter. The larger than typical diameter of the concentrate inlet and outlet allows for the increased concentrate flow through the system which is caused by the high flux membrane. One embodiment uses a faucet 104 without an airgap and the air gap is located remote from the faucet.

Figure 8B:
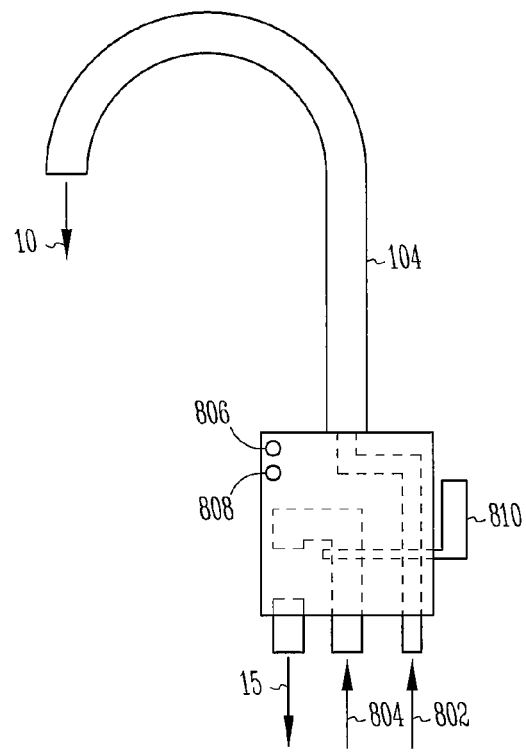
FIG. 8B shows an air gap faucet according to one embodiment.

FIG. 8B shows an airgap faucet according to one embodiment where the faucet includes an actuator 810 which has a built-in concentrate shut-off. This example can omit the ASO valve within assembly 102.

Various other embodiments of faucets can be used in the present system. In one example, the ASO valve can be incorporated in the faucet and coupled to the concentrate and permeate inlets. One example can utilize a solenoid shut-off within the faucet. One example puts electronics 122 (See FIG. 1) within the faucet.

Referring again to FIG. 1, electronic monitoring systems can be available on system 100. For example, electronics 122 can be coupled to the reed switch of the ASO valve and detect each time the valve is opened or closed, thus allowing the system to know how long the system has been in actual use. This information can be used to predict when the pre-filter needs to be changed. TDS (total dissolved solids) sensors can be coupled to the feed line and the permeate line for comparison. This information can be used to tell a user when to change the membrane elements. The electronics can also cause the indicator lights on the assembly or faucet to display as needed, as described above. For example, displaying when the filter and membrane element need to be changed. In some examples, each electronic system can consist of: 1) an electronic clock that displays every 6 or 12 months that filters need replacing and; 2) a TDS monitor that uses conductivity sensors to compare inlet TDS versus outlet (permeate) TDS and notifies the user when the % Rejection drops below a certain value (for example, 75% Rejection). Indicators, such as LEDs, LCDs, etc. can be mounted at the faucet and on the assembly and light up to show when elements need changing.

Figure 10:
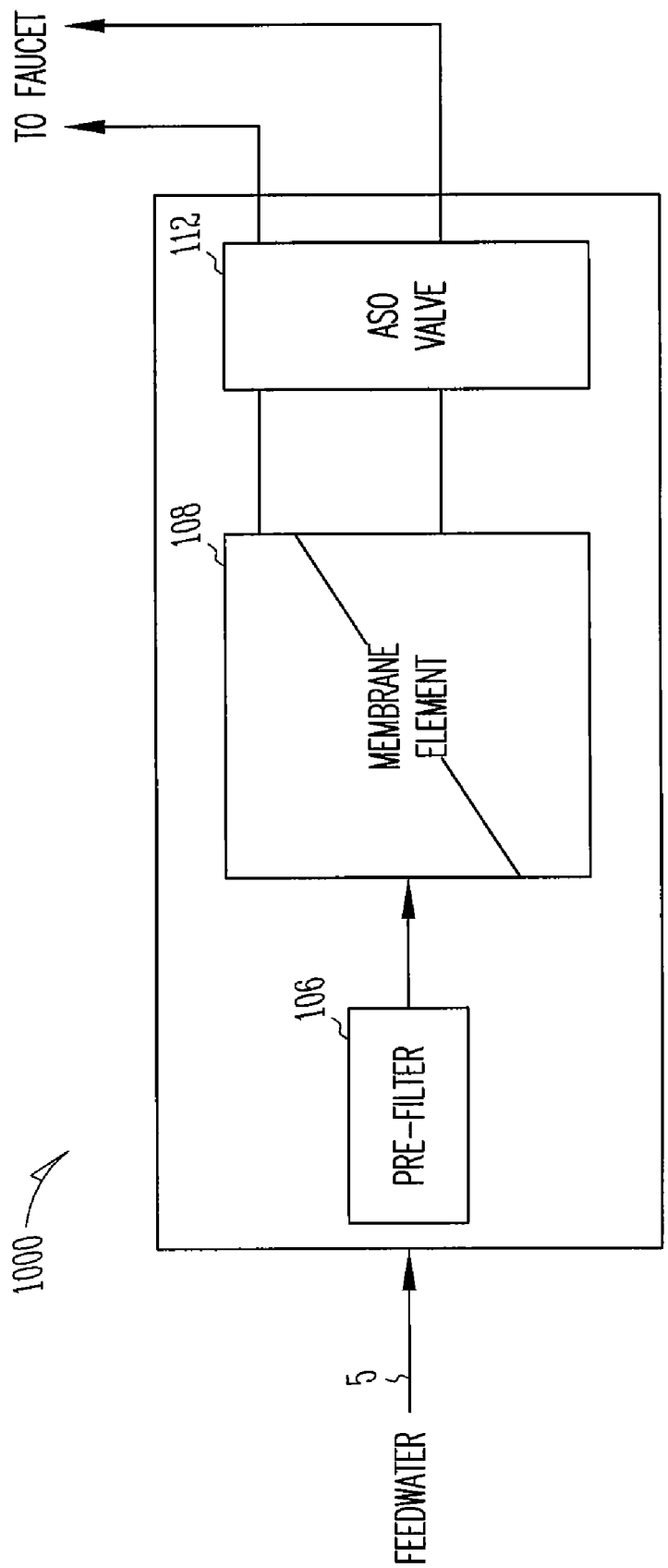
FIG. 10 shows a schematic representation of a filtration system according to one embodiment.

FIG. 10 shows a filtration system according to one embodiment. System 1000 includes a single membrane element 108 within an assembly. The element can be formed as will be discussed below. A pre-filter 106 is connected to the assembly inlet. An ASO valve 112 is connected to the permeate and concentrate lines as discussed above. In one embodiment, system 1000 can be a disposable system in which the housing assembly is uncoupled from the feed line 5 and the outlet lines and replaced with a fresh system.

Example Membranes

Examples of RO membranes usable in a membrane element of the present system can be prepared by the following methods. One method for preparing a reverse osmosis membrane having improved flux properties includes treating a starting reverse osmosis membrane with dipropylammonium nitrate, diisopropylethylammonium nitrate, triethylammonium nitrate, tetraethylammonium nitrate, diethylammonium nitrate or tetraethylammonium borate, or a mixture thereof (and optionally drying) to provide a reverse osmosis membrane having improved flux properties. One method of improving the permeability of a reverse osmosis membrane includes treating a reverse osmosis membrane with an aqueous solution of an organic nitrate or borate salt, drying; and optionally recovering the membrane.

Reverse osmosis membranes which can be treated according to the methods described herein include the reaction product of polyacryl halides, polysulfonyl halides or polyisocyanates and polyamines or bisphenols. The reaction product is typically deposited within and/or on a porous support backing material.

Reverse osmosis membranes can be prepared using methods that are generally known in the art, for example using methods similar to those described in U.S. Pat. Nos. 3,744,642; 4,277,344; 4,948,507; and 4,983,291. Such methods entail coating an aqueous solution of a polyamine or a bisphenol, and preferably a polyamine, on a porous support backing material. Thereafter, the surface of the coated support material is optionally freed of excess amine solution and is contacted with an organic solution of a polyacryl halide, polysulfonyl halide or polyisocyanate to provide the reverse osmosis membrane, which can be utilized as a starting material in the method of the invention. These membranes may further be dried from glycerin, or drying agents disclosed in aforementioned patents.

The porous support backing material typically comprises a polymeric material containing pore sizes which are of sufficient size to permit the passage of permeate therethrough, but are not large enough so as to interfere with the bridging over of the resulting ultrathin reverse osmosis membrane. Examples of porous support backing materials which may be used to prepare the desired membrane composite of the present invention will include such polymers as polysulfone, polycarbonate, microporous polypropylene, the various polyamides, polyimines, polyphenylene ether, various halogenated polymers such as polyvinylidine fluoride, etc.

The porous support backing material may be coated utilizing either a hand coating or continuous operation with an aqueous solution of monomeric polyamines or to render the resulting membrane more resistant to environmental attacks of monomeric secondary polyamines. These monomeric polyamines may comprise cyclic polyamines such as piperazine, etc.; substituted cyclic polyamines such as methyl piperazine, dimethyl piperazine, etc.; aromatic polyamines such as m-phenylenediamine, o-phenylenediamine, p-phenylenediamine, etc.; substituted aromatic polyamines such as chlorophenylenediamine, N,N'-dimethyl-1,3-phenylenediamine, etc.; multi-aromatic ring polyamines such as benzidine, etc.; substituted multi-aromatic ring polyamines such as 3,3*-dimethylbenzidene, 3,3*-dichlorobenzidene, etc.; or a mixture thereof depending on the separation requirements as well as the environmental stability requirements of the resulting membranes.

The solution which is utilized as the carrier for the aromatic polyamine will typically comprise water in which the aromatic polyamine will be present in an amount in the range of from about 0.1 to about 20% by weight of the solution and which will have a pH in the range of from about 7 to about 14. The pH may either be the natural pH of the amine solution, or may be afforded by the presence of a base. Some examples of these acceptors will include sodium hydroxide, potassium hydroxide, sodium carbonate, triethylamine, N,N'-dimethylpiperazine, etc. Other additives in the amine solution may include surfactants, amine salts (for example see U.S. Pat. No. 4,984,507), and/or solvents (for example see U.S. Pat. No. 5,733,602).

After coating the porous support backing material with the aqueous solution of the aromatic polyamine, the excess solution is optionally removed by suitable techniques. Following this, the coated support material is then contacted with an organic solvent solution of the aromatic polyacryl halide. Examples of aromatic polyacryl halides which may be employed will include di- or tricarboxylic acid halides such as trimesoyl chloride (1,3,5-benzene tricarboxylic acid chloride), isophthaloyl chloride, terephthaloyl chloride, trimesoyl bromide (1,3,5-benzene tricarboxylic acid bromide), isophthaloyl bromide, terephthaloyl bromide, trimesoyl iodide (1,3,5-benzene tricarboxylic acid iodide), isophthaloyl iodide, terephthaloyl iodide, as well as mixtures of di-tri, tri-tri carboxylic acid halides, that is, trimesoyl halide and the isomeric phthaloyl halides. Alternative reactants to the aromatic polyacryl halide include aromatic di or tri sulfonyl halides, aromatic di or tri isocyanates, aromatic di or tri chloroformates, or aromatic rings substituted with mixtures of the above substituents. The polyacryl halides may be substituted to render them more resistant to further environmental attack.

The organic solvents which are employed in the process described herein will comprise those which are immiscible with water, immiscible or sparingly miscible with polyhydric compounds and may comprise paraffins such as n-pentane, n-hexane, n-heptane, cyclopentane, cyclohexane, methylcyclopentane, naphtha, Isopars, etc. or halogenated hydrocarbon such as the Freon series or class of halogenated solvents.

A reverse osmosis membrane, for example a membrane prepared as described above, is exposed to dipropylammonium nitrate, diisopropylethylammonium nitrate, triethylammonium nitrate, tetraethylammonium nitrate, diethylammonium nitrate or tetraethylammonium borate, or a mixture thereof for a period of time ranging from about 1 second to about 24 hours. The exposure of the membrane is usually affected at temperatures ranging from ambient up to about 90 degrees C. or more and preferably at a temperature in the range of from about 20 degrees to about 40 degrees C.

Following exposure of the membrane, it is dried at elevated temperature (up to about 170 degrees C.) for a period of time ranging from about 30 seconds to about 2 hours or more in duration.

Representative Membrane Elements

A spiral wound element is comprised of a leaf, or a combination of leaves, wound around a central tube with a feed spacer material. Each leaf is a combination of two membranes with a permeate carrier placed between the membranes. The region between the two membrane sheets is called the permeate channel. The leaf package is sealed to separate the permeate channel, with part of the permeate channel unsealed to allow for removal of the permeate fluid. For instance, in a spiral-wound membrane element, three sides of the leaf are typically sealed, while the fourth side of the leaf is typically connected to a permeate tube. The leaf length is defined as the longest straight-line distance of permeate flow to the permeate collection channel.

Spiral-wound membrane elements are relatively inexpensive to produce. A single-leaf membrane element is much simpler and less costly to produce than membrane elements that contain multiple leaves. Each extra leaf used in a membrane element reduces the maximum amount of area that can be placed in an element having specific dimensions because the additional leaves require additional glue lines and also because the typical fold of a leaf at the permeate tube is often sealed and can account for lost active membrane area. Further, additional leaves in a membrane element lead to a higher likelihood of element failure because of improperly placed leaves during element fabrication and also because higher amounts of leaves make it more difficult to produce a uniformly round element.

An ultra high flux RO membrane prepared as discussed above provides a water permeability that is nearly three times as great as the permeability of brackish water RO membranes and provides about 75% greater permeability than "low pressure" RO membranes. The ultra high flux RO membrane has extremely high pure water permeability.

The permeate carrier's function is to provide a channel for the permeate to flow through on its way to the permeate tube. The permeate carrier must be able to effectively keep the adjacent membranes from intruding into the permeate channel and must provide a relatively low resistance to permeate flow. Any pressure build-up in the permeate channel will cause an equal reduction in the net driving force of the membrane process. The net driving force to the membrane is defined as the pressure in the feed channel minus the osmotic pressure and minus the permeate pressure.

In most home reverse osmosis applications, the typical amount of average pressure loss in the permeate channel is low relative to the net driving pressure. Consequently, the pressure loss in the permeate channel does not overly affect the overall output of the membrane element. However, when a membrane element is produced that uses the newly developed high flux membranes discussed above, the resulting high membrane flux rates leads to a significant pressure loss in the permeate channel can have a major impact on the total element output. Moreover, the salt rejecting ability of RO membranes is directly related to the driving pressure, with higher driving pressures leading to higher salt rejection. Therefore, the permeate side pressure loss does not only reduce membrane flux but also increases the salt passage through the membrane.

In one embodiment, the present system utilizes new permeate carrier materials that have a lower resistance to flow and therefore provide improved element flux and reduced salt passage. Further, because the newly developed high flux membranes can operate at low pressures, the permeate carrier does not need to maintain the integrity of the permeate channel at the high pressures required by current reverse osmosis membranes.

Permeate Channel Design

For a given feed solution where the viscosity is fixed, the H value of a permeate channel is dependent on the friction factor and the thickness of the permeate channel. Thus to minimize the H value of a permeate channel its thickness can be increased. However, as elements are often designed to fit within pressure vessels of fixed diameter, increased permeate channel thickness necessitates the use of less membrane area. As less membrane area reduces the element flow, other strategies to lower the H value are desirable.

The friction factor reflects pressure drop from flow through the permeate channel due to several factors, including: friction with the permeate carrier surfaces, turbulence promoted by the channel geometry, and other permeate carrier design factors that are independent of thickness. Improved H values obtained through decreased friction factors allows thinner and more efficient permeate carriers to be used. Thus permeate carriers with lower friction factors would be highly useful.

The friction factor of a permeate carrier can most easily be decreased by increasing the size of the channels it contains. However, in addition to transporting permeated fluid, the permeate carrier needs to support the membrane against the hydraulic pressure used to drive the separation. If the permeate carrier is unable to properly support the membranes, the permeate channel thickness will be reduced, leading to higher permeate channel pressure drop and also may lead to element deformation. In the past, low membrane A-values (<20) have required the use of high net driving pressures (>100 psi) to obtain reasonable fluxes and as a result, relatively dense permeate channels were required to support the permeate carrier from compaction. These dense channels have a high resistance to flow and thus give high H values. However, because the applied pressure was significantly high relative to the pressure build-up in the permeate channel, the membrane elements yielded a relatively high β term.

Accordingly, with new higher flux membranes, use of existing permeate carriers proved difficult as poor efficiencies were obtained. However, as lower operating pressures are used with these membranes it was found that new types of permeate carriers could now be used which had relatively wide channels. These provided low H values while still supporting the permeate channel at the pressures used.

The permeate carriers effective for use in these elements are unique by virtue of their low H value for a given thickness. Two examples are a permeate carrier having an H-value of approximately 0.01 (AtmSec/cm3) with a thickness of approximately 13 mils (an example is Naltex 75-3719), and a permeate carrier having an H-value of approximately 0.026 (AtmSec/cm3) with a thickness of approximately 20 mils (an example is Naltex S-1111). The permeate carriers are also unique in that they provide low resistance while being thin, yet are still able to support the permeate channel from significant intrusion by the membranes.

In other embodiments, the permeate carrier can be made of any suitable material having the flow resistance characteristics (e.g. H values) described herein, provided the material is capable of suitably supporting the permeate channel under operating conditions. For example, the permeate carrier can be made of metal (e.g. stainless steel), ceramic, or an organic polymer (e.g. nylons, polypropylenes, polyesters, or coated polyesters). Suitable materials have previously been utilized in a variety of applications, for example as feed spacers in spiral-wound reverse osmosis elements (feed spacers for reverse osmosis are typically 17 mils thick or greater, with some exceptions allowing for feed spacers as thin as 13 mils to be used), as supports for pleated filters (6-mil to about 20-mil thick spacers are commonly used in these applications), as covering for depth filtration media to prevent the media from migrating (6-mil to about 20-mil thick spacers are commonly used in these applications), as HVAC screens in the automotive industry, or as tank liners. Accordingly, such materials are commercially available. Additionally, materials having the desired thickness and permeability properties can be prepared for use in the materials and methods of the invention. In various embodiments, membrane elements can be formed having an permeate channel H-value of approximately 0.10, or approximately 0.10 or less. Some embodiments, have a permeate channel H-value of approximately 0.06, or approximately 0.06 or less. Various embodiments utilize membranes having an average A-value of approximately 16 or greater; an average A-value of approximately 22 or greater; an average A-value of approximately 25 or greater; an average A-value of approximately 30 or greater; and an average A-value of approximately 35 or greater.

EXAMPLES

Membrane elements can be formed with various geometries depending on length, width, and performance characteristics desired. The present system allows for the use of optimized sized elements for use in a point-of-use system. Many different sizes and characteristics will be usable with the present system. Accordingly, the following examples are given for illustration and are not limiting.

Example 1

Sample membrane elements were formed having the following specifications and were tested with the results as shown:

| Sample# | Flow, gpd @ 77 F. | % Rejection |
|---|---|---|
| 1 | 227.07 | 93.6% |
| 2 | 234.62 | 94.8% |

| Element Specifications | |
|---|---|
| #Leafs | 1 |
| Permeate Carrier H-value | .06 |
| Flat Sheet A-value | 23.9 |
| Flat Sheet Rejection (%) | 97 |
| Dimensions (in) | |
| Scroll Width | 18 |
| Diameter | 2.4 |
| Feed Spacer Thickness (mils) | 21 |
| Permeate Carrier Thickness (mils) | 13 |
| Leaf Length (ft) | 6.4 |
| Tube OD (in) | 1 |
| β (Efficiency %) | 74.5 |

| Test Conditions (Element) | |
|---|---|
| Pressure (psig) | 65 |
| Pressure output (psig) | 41 |
| Feed Cond (uS) | 1082 |
| Feed Conc (ppm) | 534 |
| Feed T (deg F.) | 75.56 |

| Test Conditions (Flat Sheet) | |
|---|---|
| Pressure (psig) | 100 |
| Feed Conc (ppm) | 500 |
| Feed T (deg F.) | 77 |

Example 2

Theoretical Optimized 2 Element Design @ 65 psi, 500 ppm NaCl/RO 25% recovery 360GPD/element

| Element Specifications | |
|---|---|
| #Leafs | 1 |
| PC H-value | .03 |
| Flat Sheet A-value | 30 |
| Flat Sheet Rejection (%) | 97 |
| Dimensions (in) | |
| Scroll Width | 18 |
| Diameter | 2.6 |
| FS Thickness (mils) | 21 |
| PC Thickness (mils) | 13 |
| Leaf Length (ft) | 6.9 |
| Tube OD (in) | 1 |
| β (Efficiency %) | 81.2 |

| Test Conditions | |
|---|---|
| Pressure (psig) | 65 |
| Pressure output (psig) | 65 |
| Feed Conc (ppm) | 500 |
| Feed T (deg F.) | 77 |

| Test Conditions (Flat Sheet) | |
|---|---|
| Pressure (psig) | 100 |
| Feed Conc (ppm) | 500 |
| Feed T (deg F.) | 77 |

Example 3

Theoretical Optimized 1 Element Design @ 65 psi, 500 ppm NaCl/RO 25% recovery 720GPD/element

| Element Specifications | |
|---|---|
| #Leafs | 8 |
| PC H-value | .06 |
| Flat Sheet A-value | 30 |
| Flat Sheet Rejection (%) | 97 |
| Dimensions (in) | |
| Scroll Width | 13 |
| Diameter | 3.7 |
| FS Thickness (mils) | 21 |
| PC Thickness (mils) | 13 |
| Leaf Length (ft) | 1.7 |
| Tube OD (in) | 1 |
| β (Efficiency %) | 96.9 |

| Test Conditions | |
|---|---|
| Pressure (psig) | 65 |
| Pressure output (psig) | 65 |
| Feed Conc (ppm) | 500 |
| Feed T (deg F.) | 77 |

| Test Conditions (Flat Sheet) | |
|---|---|
| Pressure (psig) | 100 |
| Feed Conc (ppm) | 500 |
| Feed T (deg F.) | 77 |

Sample systems were also formed with the following specifications and were tested with the results shown:

Example 4

In this example, two high-flux membrane elements having the specifications noted below were placed in an assembly of a tank-less residential reverse osmosis system. The system consists of a Ø3"×10" GAC pre-filter in a 10" sump housing, two high-flux membrane elements in individual element housings, automatic shutoff valve, a fixed orifice concentrate flow restrictor, a home reverse osmosis drinking water faucet, and the necessary tubing and fittings to make fluid connections to a feed water source, drain, and drinking water faucet. The membrane elements were connected in series. The automatic shutoff valve is a spring biased pressure sensing diaphragm valve. The valve operates on the concentrate flow of the second element with control input from the permeate pressure.

Both membrane elements were tested prior to assembly into the example system, under the following conditions: 50 psi feed pressure, 77° F., 500 ppm NaCl, 25% recovery, with the results below.

The example system was tested under the following conditions: 45 psi feed, 65° F., 540 µs feed conductivity, 22% recovery. The system produced 518 GPD permeate at 92% rejection. When the results are normalized to home reverse osmosis conditions, adjusting for net driving pressure, osmotic pressure and temperature, the system is projected to produce 1021 GPD at 92% rejection.

| System Specifications | |
|---|---|
| Housing Assembly Volume | 1451 in$^3$ |
| Length | 21.5" |
| Width | 9" |
| Depth | 7.5" |
| Element #1 | |
| A-value | 26 |
| H-value | .03 |
| Rejection | 93% |
| Diameter | 2.9" |
| Length | 18" |
| Element #2 | |
| A-value | 36 |
| H-value | .03 |
| Rejection | 90% |
| Diameter | 2.9" |
| Length | 18" |

As is seen from the examples above, by utilizing a membrane as discussed herein and by modifying various membrane element specifications (size, number of leafs, etc), a pumpless, tankless RO system can be designed which is optimized for one or more design features, such as overall size and output. For example, by utilizing high-flux membranes with an appropriate permeate carrier, one or more elements can be placed in a housing assembly having an overall volume small enough to fit within a standard kitchen sink cabinet. Such assemblies can further be connected together in series or parallel if desired. Systems can be built having a permeate flow rate of at least 500 GPD when the system is operating under home reverse osmosis conditions; a permeate flow rate of at least 750 GPD; and a permeate flow rate of at least 1000 GPD.

Moreover, the present pump-free tankless residential RO system can be more compact, have less service issues, cost less and provide better performance than existing products. The system can be mounted underneath a kitchen sink using a minimum amount of space. Moreover, the hardware associated with current designs (i.e. storage tank, shut-off valve location, and check valve) will not be needed thus decreasing costs and space requirements while increasing reliability. Although the present discussion describes a high flow, pumpless, tankless RO system, some embodiments could incorporate either of those items if desired.

In various embodiments, the discussion and features discussed herein can be combined and modified to provide for various home RO systems. For example, one embodiment can a tankless reverse osmosis system which is capable of producing a permeate flow rate of at least 500 GPD when the system is operating under home reverse osmosis conditions and is dimensioned to fit within a standard kitchen sink cabinet. In one embodiment, the present system can include a housing assembly having an inlet to receive feed water, a pre-filter coupled to the inlet to receive the feed water, the pre-filter having an outlet, a membrane element to receive the feed water from the outlet of the pre-filter, the membrane element having a permeate output and a concentrate outlet, and a faucet to receive filtered water from the permeate outlet, wherein there is not an intervening storage tank between the membrane element and the faucet, wherein the membrane element is capable of producing at least 500 GPD under home reverse osmosis conditions and wherein the membrane element is enclosed within a housing assembly dimensioned to fit within a standard kitchen sink cabinet.

In one embodiment, the system can include a housing assembly, an inlet on the assembly to receive feed water, a prefilter member communicating with the inlet to receive the feed water from the inlet, and a membrane element communicating with an outlet of the prefilter to receive the feed water from the prefilter member, the membrane element having a concentrate outlet and a permeate outlet, wherein the permeate outlet is connected to a faucet without an intervening storage tank, wherein the membrane element includes a spiral wound membrane element which includes a first membrane sheet and a second membrane sheet separated by a permeate carrier, wherein the spiral wound membrane element has a diameter of approximately 6 inches or less and a length of approximately 18 inches or less. In one option, the membrane element can have a diameter of approximately 3 inches or less.

In one embodiment, the system can include a housing assembly, an inlet on the assembly to receive feed water, a prefilter member communicating with the inlet to receive the feed water from the inlet, a pair of membrane elements both communicating with an outlet of the prefilter to receive the feed water from the prefilter member, each membrane element having a concentrate outlet and a permeate outlet, wherein each of the permeate outlets is connected to a faucet without an intervening storage tank, each membrane element including a membrane device including a single leaf structure which includes a first membrane and a second membrane separated by a permeate carrier.

In one embodiment, the system can include a housing assembly, an inlet on the assembly to receive feedwater, a prefilter member communicating with the inlet to receive the feed water from the inlet, and a pair of membrane elements both communicating with an outlet of the prefilter to receive the feed water from the prefilter member, each membrane element having a concentrate outlet and a permeate outlet, wherein the permeate outlet is connected to a faucet without an intervening storage tank, each membrane element including a membrane device including a leaf structure which includes a first membrane and a second membrane separated by a permeate carrier, wherein the membrane device has an outer diameter of approximately 6 inches or less and a length of approximately 18 inches or less, wherein the membrane device has a $\beta$ value of at least about 0.75.

In one embodiment, the system can include a membrane element having a feed water inlet, a permeate outlet connected to a permeate outlet line, and a concentrate outlet connected to a concentrate outlet line, wherein the permeate outlet is connected to a faucet without an intervening storage tank, and an automatic shut-off valve coupled to the concentrate outlet line and the permeate outlet line and located such that the automatic shut-off valve opens and closes due to the pressure differential between the permeate outlet line and the concentrate outlet line.

All publications, patents, and patent documents mentioned herein are incorporated by reference herein, as though individually incorporated by reference. It is understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A reverse osmosis (RO) system comprising:
   a housing that includes an inlet port, a permeate port and a concentrate port;
   a membrane element within the housing;
   a first connector that includes a first end which is adapted to receive a first hose and a second end that is connected to the inlet port;
   a second connector that includes a first end which is adapted to receive a second hose and a second end that is connected to the permeate port;
   a third connector that includes a first end which is adapted to receive a third hose and a second end that is connected to the concentrate port; and
   a key that is inserted between each of the first, second and third connectors, the key being configured such that the key can not be inserted between each of the first, second and third connectors unless each of the first, second and third connectors is properly connected to the respective inlet, permeate and concentrate ports.

2. The reverse osmosis (RO) system of claim 1, wherein the second end of the first connector is inserted into the inlet port.

3. The reverse osmosis (RO) system of claim 2, wherein the second end of the second connector is inserted into the permeate port.

4. The reverse osmosis (RO) system of claim 3, wherein the second end of the third connector is inserted into the concentrate port.

5. The reverse osmosis (RO) system of claim 1, wherein the first end of the first connector is adapted to receive the first hose such that the first hose is inserted into the first end of the first connector.

6. The reverse osmosis (RO) system of claim 5, wherein the first end of the second connector is adapted to receive the second hose such that the second hose is inserted into the first end of the second connector.

7. The reverse osmosis (RO) system of claim 6, wherein the first end of the third connector is adapted to receive the third hose such that the third hose is inserted into the first end of the third connector.

8. The reverse osmosis (RO) system of claim 1, wherein first connector, the second connector and the third connector are different sizes.

9. The reverse osmosis (RO) system of claim 1, wherein the key includes a gripping portion to facilitate insertion of the key between each of the first, second and third connectors.

10. The reverse osmosis (RO) system of claim 1, wherein the key engages the housing, the key being configured such that the key can not be removed from between each of the first, second and third connectors when there is pressure at the inlet port.

11. A reverse osmosis (RO) system comprising:
    a housing that includes an inlet port, a permeate port and a concentrate port;
    a membrane element within the housing;
    a first connector that includes a first end which is adapted to receive a first hose and a second end that is connected to the inlet port;
    a second connector that includes a first end which is adapted to receive a second hose and a second end that is connected to the permeate port;
    a third connector that includes a first end which is adapted to receive a third hose and a second end that is connected to the concentrate port; and a key that engages the housing and is inserted between each of the first, second and third connectors, the key being configured such that the key can not be removed from between each of the first, second and third connectors when there is pressure at the inlet port.

12. The reverse osmosis (RO) system of claim 11, wherein the key can not be inserted between the first and second connectors unless each of the first, second and third connectors is properly connected to the respective inlet, permeate and concentrate ports.

13. The reverse osmosis (RO) system of claim 11, wherein the key can not be inserted between the first and third connectors unless each of the first, second and third connectors is properly connected to the respective inlet, permeate and concentrate ports.

14. The reverse osmosis (RO) system of claim 11, wherein the key can not be inserted between the second and third connectors unless each of the first, second and third connectors is properly connected to the respective inlet, permeate and concentrate ports.

15. The reverse osmosis (RO) system of claim 11, wherein first connector, the second connector and the third connector are different sizes.

16. The reverse osmosis (RO) system of claim 11, wherein the key includes a gripping portion to facilitate insertion of the key between each of the first, second and third connectors.

17. The reverse osmosis (RO) system of claim 16, wherein the gripping portion of the key prevents the key from being removed from between each of the first, second and third connectors when there is pressure at the inlet port.

18. The reverse osmosis (RO) system of claim 16, wherein the gripping portion of the key includes an opening to facilitate grasping the key.

19. The reverse osmosis (RO) system of claim 16, wherein the gripping portion of the key includes finger grips.

20. The reverse osmosis (RO) system of claim 16, wherein the key is snap-fit between the first, second and third connectors.

* * * * *